United States Patent
Ge et al.

(10) Patent No.: US 10,904,797 B2
(45) Date of Patent: Jan. 26, 2021

(54) COMMUNICATION METHOD AND DEVICE

(71) Applicant: Beijing Xiaomi Mobile Software Co., Ltd., Beijing (CN)

(72) Inventors: Weiyan Ge, Beijing (CN); Shaojun Ma, Beijing (CN); Tao Quan, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 61 days.

(21) Appl. No.: 15/846,799

(22) Filed: Dec. 19, 2017

(65) Prior Publication Data

US 2018/0176829 A1 Jun. 21, 2018

(30) Foreign Application Priority Data

Dec. 20, 2016 (CN) .......................... 2016 1 1185644

(51) Int. Cl.
*H04W 28/22* (2009.01)
*H04W 88/08* (2009.01)
(Continued)

(52) U.S. Cl.
CPC .............. *H04W 28/22* (2013.01); *H04W 8/22* (2013.01); *H04W 88/02* (2013.01); *H04W 88/08* (2013.01)

(58) Field of Classification Search
CPC ....... H04W 28/22; H04W 8/22; H04W 88/02; H04W 88/08
See application file for complete search history.

(56) References Cited

U.S. PATENT DOCUMENTS

| 8,130,705 B2 | 3/2012 | Bhattacharjee et al. |
| 2007/0153727 A1* | 7/2007 | McBeath ........... H04N 21/6402 370/329 |

(Continued)

FOREIGN PATENT DOCUMENTS

| CN | 1375950 A | 10/2002 |
| CN | 101060474 A | 10/2007 |

(Continued)

OTHER PUBLICATIONS

International Search Report in connection with corresponding PCT/CN2017/093420, dated Sep. 28, 2017, 4 pages.

(Continued)

*Primary Examiner* — Alex Skripnikov
*Assistant Examiner* — Sharmin Chowdhury
(74) *Attorney, Agent, or Firm* — Arch & Lake LLP

(57) ABSTRACT

The present disclosure discloses a communication method and device in the field of communication technology. The method includes: transmitting at least one level information of the UE to a base station, the level information being used for indicating a transmission rate of the UE for communication, when a first service is triggered, querying first level information corresponding to the first service in a corresponding relationship between the service and the level information of the UE, and if the at least one level information comprises the first level information, transmitting a first service request to the base station at a transmission rate indicated by the first level information, the first service request being used for requesting the base station to communicate with the UE for the first service according to the transmission rate indicated by the first level information.

17 Claims, 13 Drawing Sheets

```
┌─────────────────────────────────────────────────────────┐
│  Transmit at least one level information of UE to a     │
│  base station, the level information being used for     │──101
│  indicating a transmission rate of the UE for           │
│  communication                                          │
└─────────────────────────────────────────────────────────┘
                           │
                           ▼
┌─────────────────────────────────────────────────────────┐
│  When a first service is triggered, inquire first       │
│  level information corresponding to the first service   │──102
│  in a corresponding relationship between the service    │
│  and the level information of the UE                    │
└─────────────────────────────────────────────────────────┘
                           │
                           ▼
┌─────────────────────────────────────────────────────────┐
│  If the at least one level information includes the     │
│  first level information, transmit a first service      │
│  request to the base station at a transmission rate     │
│  indicated by the first level information, the first    │──103
│  service request being used to request the base station │
│  to communicate with the UE for the first service       │
│  based on the transmission rate indicated by the first  │
│  level information                                      │
└─────────────────────────────────────────────────────────┘
```

(51) Int. Cl.
    *H04W 88/02*  (2009.01)
    *H04W 8/22*   (2009.01)

(56) References Cited

U.S. PATENT DOCUMENTS

| | | | |
|---|---|---|---|
| 2007/0259673 A1* | 11/2007 | Willars | H04W 52/0225 |
| | | | 455/453 |
| 2008/0070556 A1* | 3/2008 | Bhattacharjee | H04W 72/005 |
| | | | 455/414.1 |
| 2012/0002614 A1 | 1/2012 | Ekici | |
| 2014/0045497 A1 | 2/2014 | Abe | |
| 2015/0110030 A1 | 4/2015 | Kim et al. | |
| 2016/0242164 A1 | 8/2016 | Chmiel | |
| 2016/0262144 A1 | 9/2016 | Kitazoe | |
| 2018/0183641 A1* | 6/2018 | Lin | H04L 27/2634 |
| 2020/0068607 A1* | 2/2020 | Jiang | H04L 5/0053 |

FOREIGN PATENT DOCUMENTS

| | | |
|---|---|---|
| CN | 103338470 A | 10/2013 |
| CN | 106792922 A | 5/2017 |
| EP | 2286550 B1 | 3/2014 |
| JP | 2015061289 A | 3/2015 |
| RU | 2468514 C2 | 11/2012 |
| RU | 2545527 C2 | 4/2015 |
| WO | 2015055368 A2 | 4/2015 |

OTHER PUBLICATIONS

Russian Office Action dated Oct. 25, 2018 issued in corresponding RU Patent Application No. 2017144825, 8 pages.
International Search Report (including English translation) issued in corresponding International Application No. PCT/CN2017/093420, dated Sep. 28, 2017, 4 pages.
EP Extended Search Report for EP App. No. 17208580.5, dated Apr. 12, 2018, 15 pages.
Ericsson: "HSDPA Hybrid ARQ protocol proposal", 3GPP Draft; R2-011151 HARQ Protocol Proposal, 3rd Generation Partnership Project (3GPP), Mobile Competence Centre ; 650, Route Des Lucioles ; F-06921 Sophia-Antipolis Cedex ; France, vol. RAN WG2, No. Busan, Korea; 20010528 (May 28, 2001), [retrieved on May 28, 2001].
Intel Corporation: "UE capability signaling framework for NR", 3GPP Draft; R2-168515_UE Capabiltiy_NR_VO, 3rd Generation Partnership Project (3GPP), Mobile Competence Centre ; 650, Route Des Lucioles ; F-06921 Sophia-Antipolis Cedex ; France, vol. RAN WG2, No. Reno, USA; 20161114-20161118 (Nov. 13, 2016), http://www.3gpp.org/ftp/Meetings_3GPP_SYNC/RAN2/Docs/ [retrieved on Nov. 13, 2016].
HTC: "Further discussion on UE capability signaling", 3GPP Draft; R2-168227_Further Discussion on UE Capability Signalling, 3rd Generation Partnership Project (3GPP), Mobile Competence Centre ; 650, Route Des Lucioles ; F-06921 Sophia-Antipolis Cedex ; France, vol. RAN WG2, No. Reno, USA; 20161114-20161118 (Nov. 4, 2016), http://www.3gpp.org/ftp/tsg_ran/WG2_RL2/TSGR2_96/Docs/ [retrieved on Nov. 4, 2016].
Second Office Action of Japanese Application No. 2017-547975, dated Aug. 28, 2019 and English translation, (6p).
First Office Action issued in Indian Application No. 201737039505 dated Oct. 31, 2010, (6p).
First Office Action issued in European Application No. 17208580.5, dated Dec. 7, 2020, (13p).

* cited by examiner

COMMUNICATION METHOD AND DEVICE

CROSS-REFERENCE TO RELATED APPLICATIONS

This application is based upon and claims priority to Chinese Application No. 201611185644.8, filed Dec. 20, 2016, the entire content of which is incorporated herein by reference for all purpose.

TECHNICAL FIELD

The present disclosure relates to the field of communication technology, and more particularly, to a communication method and device.

BACKGROUND

In recent years, in order to provide better communication services for user equipment (UE), the communication technology has developed rapidly. From the second generation mobile communication technology (2G) to today's fourth generation mobile communication technology (4G), the transmission rate supported by the UE is getting higher and higher.

SUMMARY

The embodiments of the present disclosure provide a communication method and device.

According to a first aspect of the present disclosure, a communication method is provided. The method may be applied to user equipment UE, and the method may include transmitting at least one level information of a user equipment (UE) to a base station, the at least one level information being used for indicating a transmission rate of the UE for communication; when a first service is triggered, querying first level information corresponding to the first service in a corresponding relationship between a service and level information of the UE; and if the at least one level information includes the first level information, transmitting a first service request to the base station at a transmission rate indicated by the first level information, the first service request being used for requesting the base station to communicate with the UE for the first service according to the transmission rate indicated by the first level information.

According to a second aspect of the present disclosure, a communication method is provided. The method may include transmitting at least one level information of a user equipment (UE) to a base station, the level information being used for indicating a transmission rate of the UE for communication; and receiving a first service instruction transmitted by the base station at a transmission rate indicated by the first level information, and if the at least one level information includes the first level information, communicating with the base station for a first service according to a transmission rate indicated by the first level information, the first level information being level information corresponding to the first service.

According to a third aspect of the present disclosure, a communication device is provided. The device may include a processor; and a memory for storing instructions executable by the processor; and where the processor may be configured to: transmit at least one level information of a user equipment (UE) to a base station, the at least one level information being used for indicating a transmission rate of the UE for communication; and receive a first service instruction transmitted by the base station at a transmission rate indicated by first level information, and if the at least one level information includes the first level information, communicating with the base station for a first service at a transmission rate indicated by the first level information, the first level information being level information corresponding to the first service.

It is to be understood that both the foregoing general description and the following detailed description are exemplary and explanatory only and are not restrictive of the invention, as claimed.

BRIEF DESCRIPTION OF THE DRAWINGS

To explain the technical solutions in the examples of the present disclosure, hereinafter, the drawings required for describing the examples will be introduced. The drawings described below are only some examples in the present disclosure. Other drawings may be obtained according to these drawings.

Figure 1:
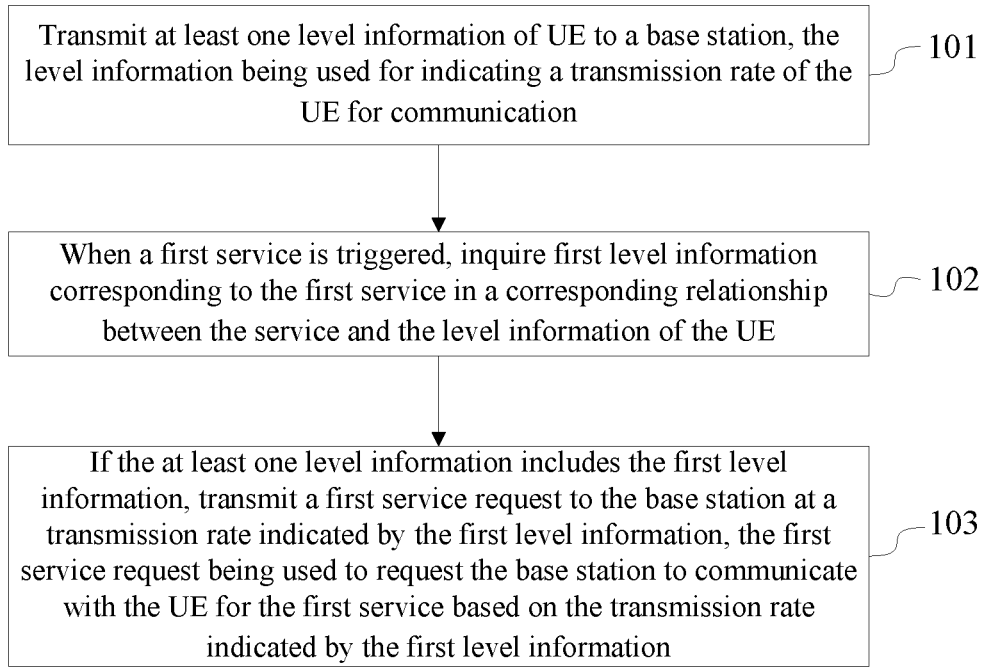
FIG. 1 is a flow chart of a communication method according to an aspect of the present disclosure.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples of the present disclosure. Also, common but well-understood elements that are useful or necessary in a commercially feasible example are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION

To make purposes, technical solutions and advantages of the present disclosure clearer, hereinafter, the implementing manners of the present disclosure will be further described in detail in conjunction with the drawings.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

References throughout this specification to "one embodiment," "an embodiment," "exemplary embodiment," or the like in the singular or plural means that one or more particular features, structures, or characteristics described in connection with an example is included in at least one embodiment of the present disclosure. Thus, the appearances of the phrases "in one embodiment," "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

For a user equipment (UE), the transmission rate may be set by the vendor in the chip of the UE. In general, the transmission rate of the UE is indicated by level information configured in the UE, and the transmission rates corresponding to different level information are different.

When the UE communicates with the base station, the UE may receive level inquiry information sent by the base station and returns one configured level information to the base station. The base station may determine an upper limit of the transmission rate supported by the UE. Based on the upper limit of the transmission rate of the UE, the base station may allocate transmission resource to the UE, and may perform communication with the UE for the wireless broadband access service.

FIG. 1 is a flow chart of a communication method according to an aspect of the present disclosure. As shown in FIG. 1, this example is applied to user equipment UE, and specifically includes the following steps.

In step 101, at least one level information of the UE is transmitted to a base station, and the level information is used to indicate a transmission rate of the UE for communication.

In step 102, when a first service is triggered, the first level information corresponding to the first service is inquired in a corresponding relationship between the service and the level information of the UE.

In step 103, if the at least one level information includes the first level information, a first service request is transmitted to the base station at a transmission rate indicated by the first level information. The first service request may be used to request the base station to communicate with the UE for the first service based on the transmission rate indicated by the first level information.

Sometimes, the one level information may not meet the needs of the actual service, which may result in the poor effect of implementing the actual service.

In the examples of the present disclosure, the UE transmits at least one level information that has been configured to the base station so that the UE and the base station can agree on the level information to be used in advance when the two parties communicate. When the first service is triggered, it is possible to determine that the first service should adopt the first level information according to the configured corresponding relationship between the service and the level information. If the first level information is included in the level information agreed by the base station and the UE in advance, it is possible to use the level information meeting the requirement of the first service when executing the first service, such that the implementation effect of the first service can be improved. Moreover, for different services, different level information may be used according to the configuration, thereby meeting a variety of service demands under the scenario of fifth generation mobile communication technology (5G).

In a possible implementation, during the communication of the base station with the UE for the first service according to the transmission rate indicated by the first level information, when a second service is triggered, second level information corresponding to the second service is queried in the corresponding relationship between the service and the level information of the UE.

If the at least one level information includes the second level information, a second service request is transmitted to the base station at a transmission rate indicated by the second level information while the base station communicates with the UE for the first service at the transmission rate indicated by the first level information. The second service request may be used for requesting the base station to communicate with the UE for the second service according to the transmission rate indicated by the second level information.

In a possible implementation, the method further includes:

When a third service is triggered, third level information corresponding to the third service is queried in the corresponding relationship between the service and the level information of the UE.

If the at least one level information does not include the third level information, the current level information of the UE is switched to the third level information.

A third service request is transmitted to the base station at a transmission rate indicated by the third level information. The third service request may carry the third level information, and the third service request may be used for requesting the base station to communicate with the UE for the third service according to the transmission rate indicated by the third level information.

In a possible implementation, after transmitting the third service request to the base station, the method further includes:

When the communication of the base station with the UE for the third service according to the transmission rate indicated by the third level information is completed, the third level information is switched to the first level information.

A level switching request is transmitted to the base station, and the level switching request may be used for instructing the base station to switch the stored third level information corresponding to the UE to the first level information.

In a possible implementation, the level information may also be used to indicate an upper limit of communication delay of the UE.

All of the alternative technical solutions described above may be combined in any way to form alternative examples of the present disclosure, which are not elaborated herein.

Figure 2:
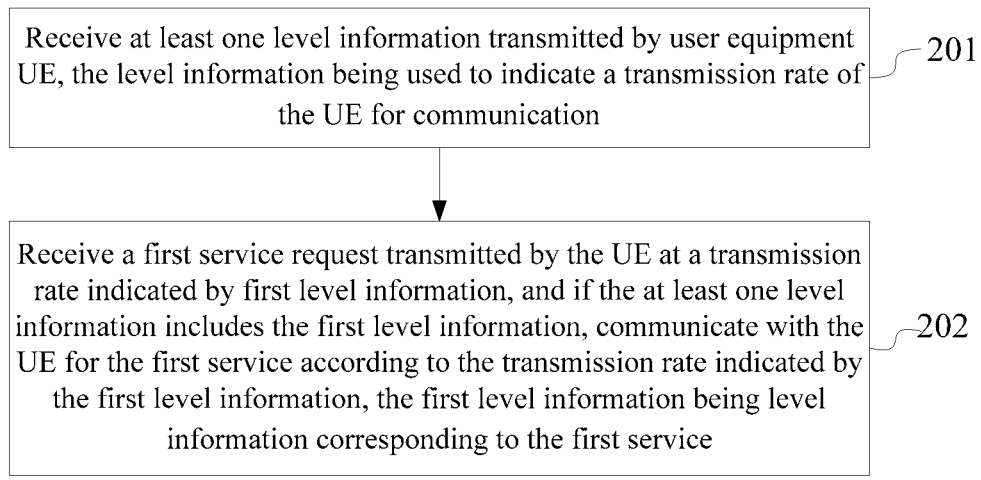
FIG. 2 is a flow chart of a communication method according to another aspect of the present disclosure.

FIG. 2 is a flow chart of a communication method according to another aspect of the present disclosure. As shown in FIG. 2, this example is applied to a base station, and specifically includes the following steps.

In step 201, at least one level information transmitted by a user equipment UE is received, and the level information may be used to indicate a transmission rate of the UE for communication.

In step 202, a first service request transmitted by the UE at a transmission rate indicated by the first level information is received, and if the at least one level information includes the first level information, communication with the UE for the first service is performed according to the transmission rate indicated by the first level information, and the first level information may be level information corresponding to the first service.

Sometimes, the one level information may not meet the needs of the actual service, which may result in the poor implementation effect of the actual service.

In the examples of the present disclosure, the UE transmits the configured at least one level information to the base station, such that the UE and the base station can agree on the level information to be used in advance when they communicate with each other. When the first service is triggered, it is possible to determine that the first service should adopt the first level information according to the configured corresponding relationship between the service and the level information. If the first level information is included in the level information agreed by the base station and the UE in advance, it is possible to use the level information meeting the requirement of the first service when executing the first service. The implementation effect of the first service can be improved. Moreover, for different services, different level information may be used according to the configuration, thereby meeting a variety of service demands under the 5G scenario.

In a possible implementation, the method further includes:

during the communication with the UE for the first service according to the transmission rate indicated by the first level information, when a second service request transmitted by the UE at a transmission rate indicated by second level information is received, it can be determined whether the at least one level information includes the second level information, and the second level information may be level information corresponding to the second service.

If the at least one level information includes the second level information, the communication with the UE is performed for the second service according to the transmission rate indicated by the second level information while communicating with the UE for the first service at the transmission rate indicated by the first level information.

In a possible implementation, the method further includes:

when a third service request carries third level information transmitted by the UE at a transmission rate indicated by the third level information is received, the base station communicates with the UE for the third service according to the transmission rate indicated by the third level information.

In a possible implementation, after communicating with the UE for the third service according to the transmission rate indicated by the third level information, the method further includes:

when a level switching request transmitted by the UE is received, the stored third level information corresponding to the UE is switched to the first level information.

In a possible implementation, the level information is also used to indicate an upper limit of communication delay of the UE.

All of the alternative technical solutions described above may be combined in any way to form alternative examples of the present disclosure, which are not elaborated herein.

Figure 3:
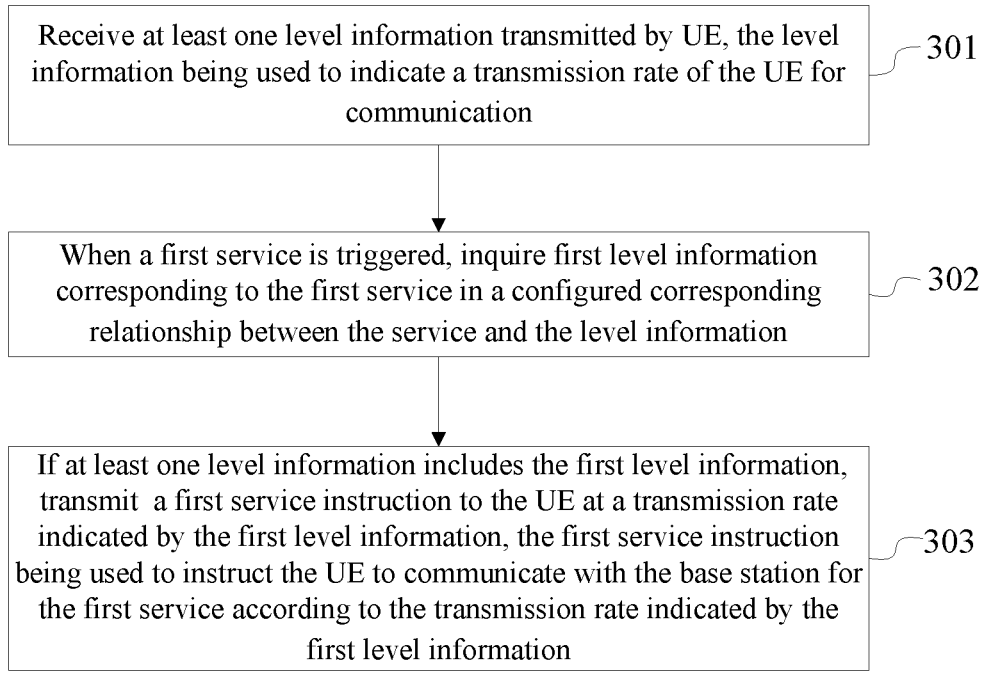
FIG. 3 is a flow chart of a communication method according to a third aspect of the present disclosure.

FIG. 3 is a flow chart of a communication method according to a third aspect of the present disclosure. As shown in FIG. 3, this example is applied to a base station, and specifically includes the following steps.

In step 301, at least one level information transmitted by UE is received, the level information being used to indicate a transmission rate of the UE for communication.

In step 302, when a first service is triggered, the first level information corresponding to the first service is inquired in a configured corresponding relationship between the service and the level information.

In step 303, if at least one level information includes the first level information, a first service instruction is transmitted to the UE at a transmission rate indicated by the first level information. The first service instruction may be used to instruct the UE to communicate with the base station for the first service according to the transmission rate indicated by the first level information.

In some cases, the original one level information may not meet the needs of the actual service, which may result in the poor implementation effect of the actual service.

In the examples of the present disclosure, the UE transmits at least one level information that has been configured to the base station so that the UE and the base station can agree on the level information to be used in advance when the two parties communicate. When the first service is triggered, it is possible to determine that the first service should adopt the first level information according to the configured corresponding relationship between the service and the level information.

If the first level information is included in the level information agreed by the base station and the UE in advance, it is possible to use the level information meeting the requirement of the first service when executing the first service, Thus, the implementation effect of the first service can be improved. Moreover, for different services, different level information may be used according to the configuration, thereby meeting a variety of service demands under the 5G scenario.

In a possible implementation, the method further includes:

During the communication of the UE with the base station according to the transmission rate indicated by the first level information, when a second service is triggered, the second level information corresponding to the second service is queried in the configured corresponding relationship between the service and the level information.

If the at least one level information includes the second level information, a second service instruction is transmitted to the UE at a transmission rate indicated by the second level information while the UE performs communication with the base station for the first service according to the transmission rate indicated by the first level information. The second service instruction may be used for indicating the UE to perform communication with the base station for the second service according to the transmission rate indicated by the second level information.

In a possible implementation, the method further includes:

When a third service is triggered, the third level information corresponding to the third service is queried in the configured corresponding relationship between the service and the level information.

If the at least one level information does not include the third level information, a first level switching instruction is transmitted to the UE at a transmission rate indicated by current level information of the UE. The first level switching instruction may be used for instructing the UE to switch the current level information to the third level information and to communicate with the base station for the third service at a transmission rate indicated by the third level information.

In a possible implementation, after transmitting the first level switching instruction to the UE, the method further includes:

When the communication of the UE with the base station for the third service at the transmission rate indicated by the third level information is completed, a second level switching instruction is transmitted to the UE, and the second level switching instruction may be used for instructing the UE to switch the third level information to the first level information.

A switching success message transmitted by the UE is received, and the stored third level information corresponding to the UE is switched to the first level information.

In a possible implementation, the level information is also used to indicate an upper limit of communication delay of the UE.

All of the alternative technical solutions described above may be combined in any way to form alternative examples of the present disclosure, which are elaborated herein.

Figure 4:
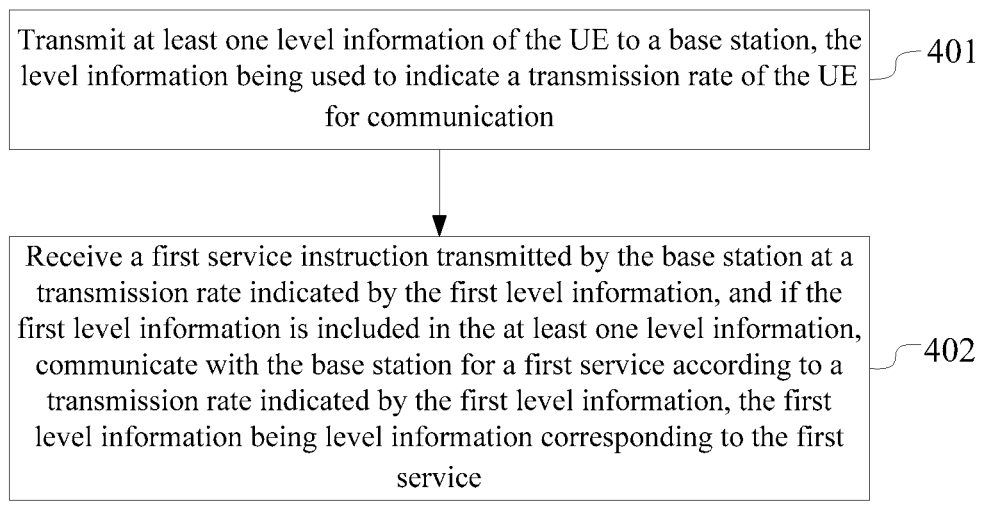
FIG. 4 is a flow chart of a communication method according to a fourth aspect of the present disclosure.

FIG. 4 is a flow chart of a communication method according to a fourth aspect of the present disclosure. As shown in FIG. 4, this example is applied to user equipment UE, and specifically includes the following steps.

In step 401, at least one level information of the UE is transmitted to a base station, and the level information may be used to indicate a transmission rate of the UE for communication.

In step 402, a first service instruction transmitted by the base station at a transmission rate indicated by the first level information is received, and if the first level information is included in the at least one level information, the communication with the base station for a first service is performed according to a transmission rate indicated by the first level information, and the first level information may be level information corresponding to the first service.

In a possible implementation, the method further includes:

during the communication with the base station for the first service according to the transmission rate indicated by the first level information, when a second service instruction transmitted by the base station at a transmission rate indicated by second level information is received, it can be determined whether the at least one level information includes the second level information, and the second level information may be level information corresponding to the second service.

If the at least one level information includes the second level information, the US communicates with the base station for the second service at a transmission rate indicated by the second level information while communicating with the base station at the transmission rate indicated by the first level information.

In some cases, the original one level information may not meet the needs of the actual service, which may result in the poor implementation effect of the actual service.

In the examples of the present disclosure, the UE transmits the configured at least one level information to the base station. The UE and the base station can agree on the level information to be used in advance when they communicate with each other. When the first service is triggered, it is possible to determine that the first service should adopt the first level information according to the configured corresponding relationship between the service and the level information. If the first level information is included in the level information agreed by the base station and the UE in advance, it is possible to use the level information meeting the requirement of the first service when executing the first service. Thus, the implementation effect of the first service can be improved. Moreover, for different services, different level information may be used according to the configuration, thereby meeting a variety of service demands under the 5G scenario.

In a possible implementation, the method further includes:

A first level switching instruction carrying third level information transmitted by the base station is received at a transmission rate indicated by current level information. The current level information is switched to the third level information, and the UE communicates with the base station for a third service at a transmission rate indicated by the third level information.

In a possible implementation, after receiving the first level switching instruction transmitted by the base station at the transmission rate indicated by the current level information, the method further includes:

When a second level switching instruction transmitted by the base station is received, the third level information is switched to the first level information.

A switching success message is transmitted to the base station, where the switching success message may be used for instructing the base station to switch the stored third level information corresponding to the UE to the first level information.

In a possible implementation, the level information is also used to indicate an upper limit of communication delay of the UE.

All of the alternative technical solutions described above may be combined in any way to form alternative examples of the present disclosure, which are elaborated herein.

In the communication process, a service may be triggered on the UE, or may be triggered on the base station. For example, the user triggers a video link on the UE, to cause the UE to send a data transmission request for the video link to the base station, or the base station receives the data pushed by the server to the UE and forwards the pushed data to the UE.

Figure 6:
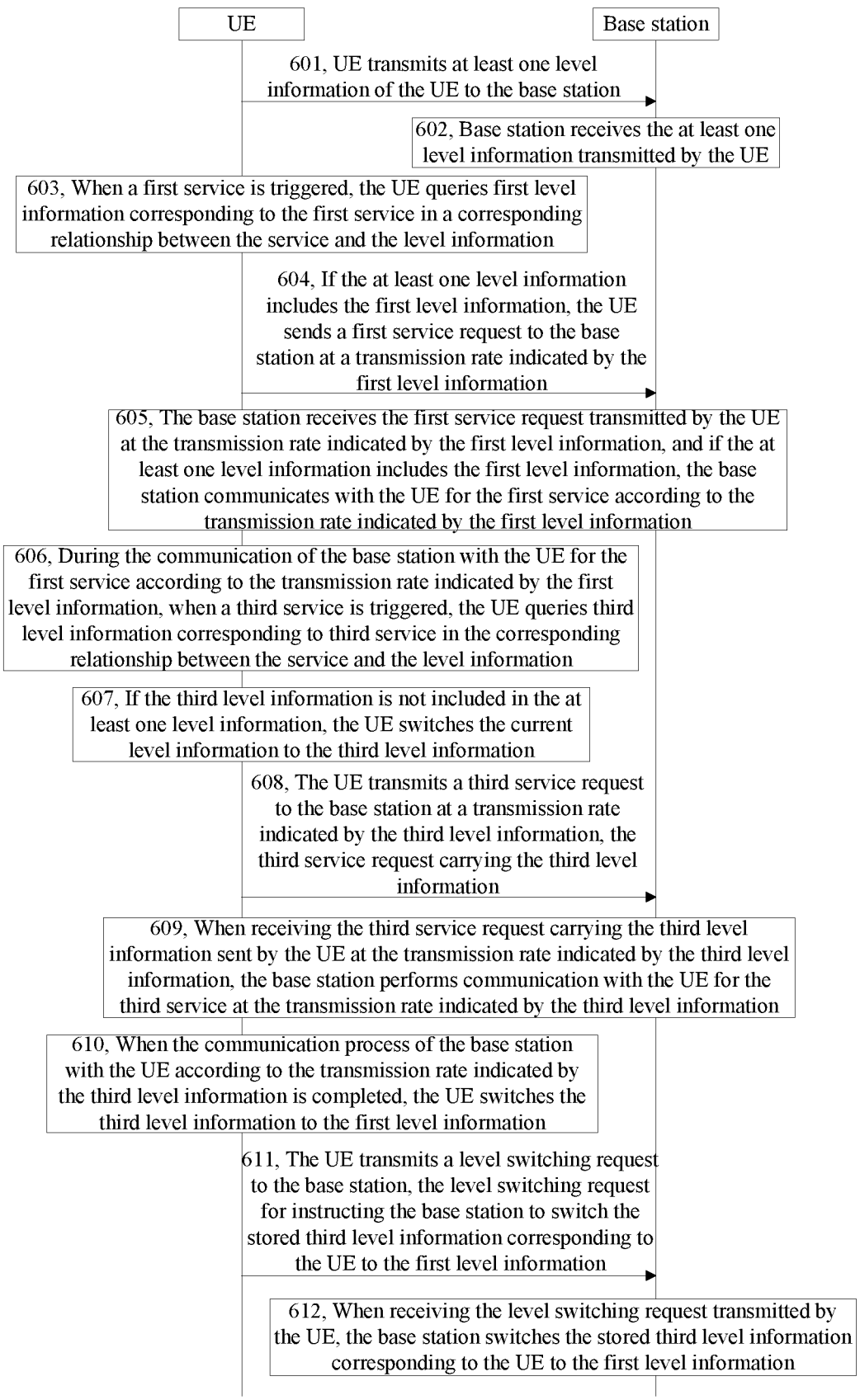
FIG. 6 is a flow chart of a communication method according to a sixth aspect of the present disclosure.
Figure 7:
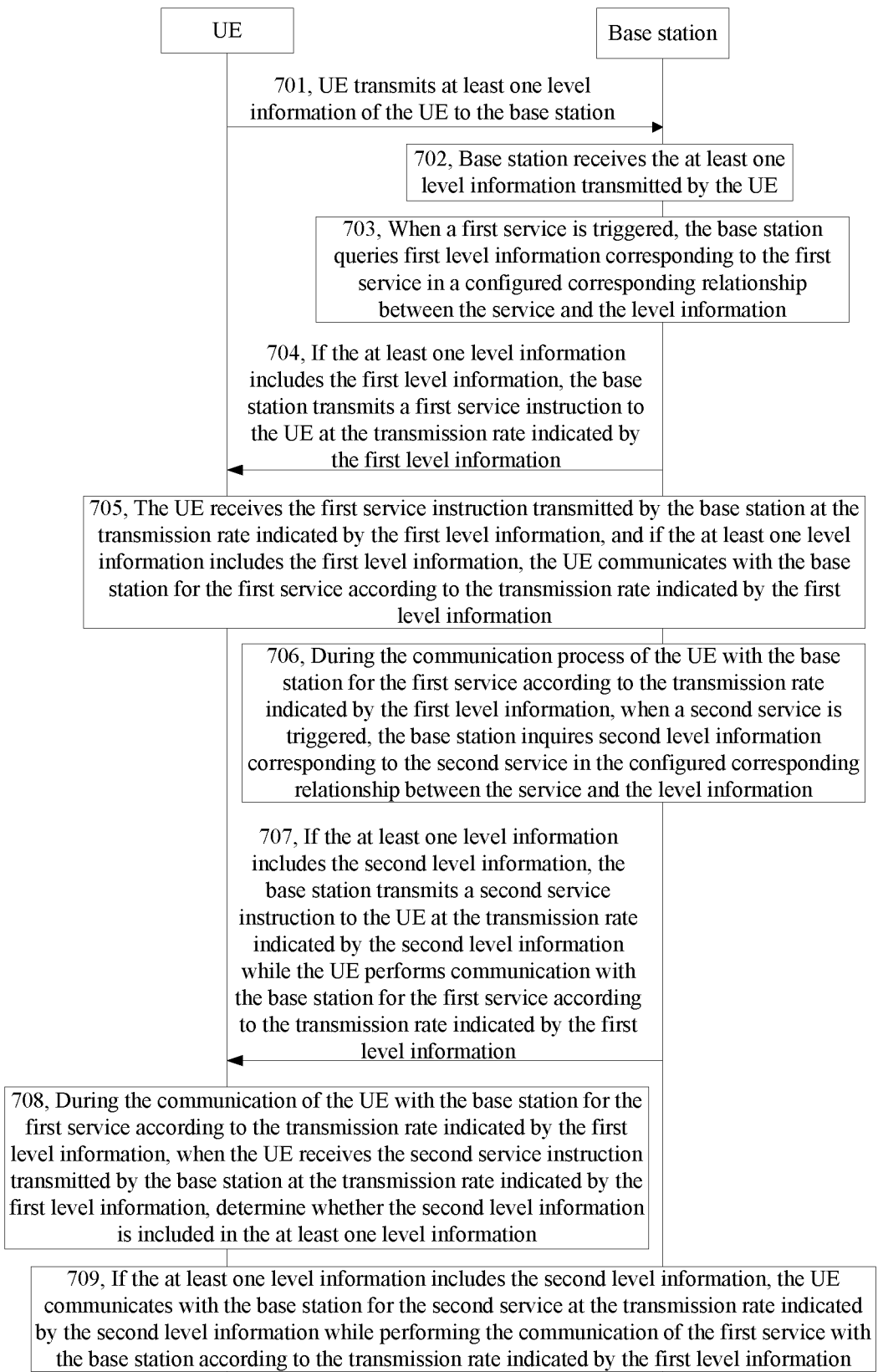
FIG. 7 is a flow chart of a communication method according to a seventh aspect of the present disclosure.
Figure 8:
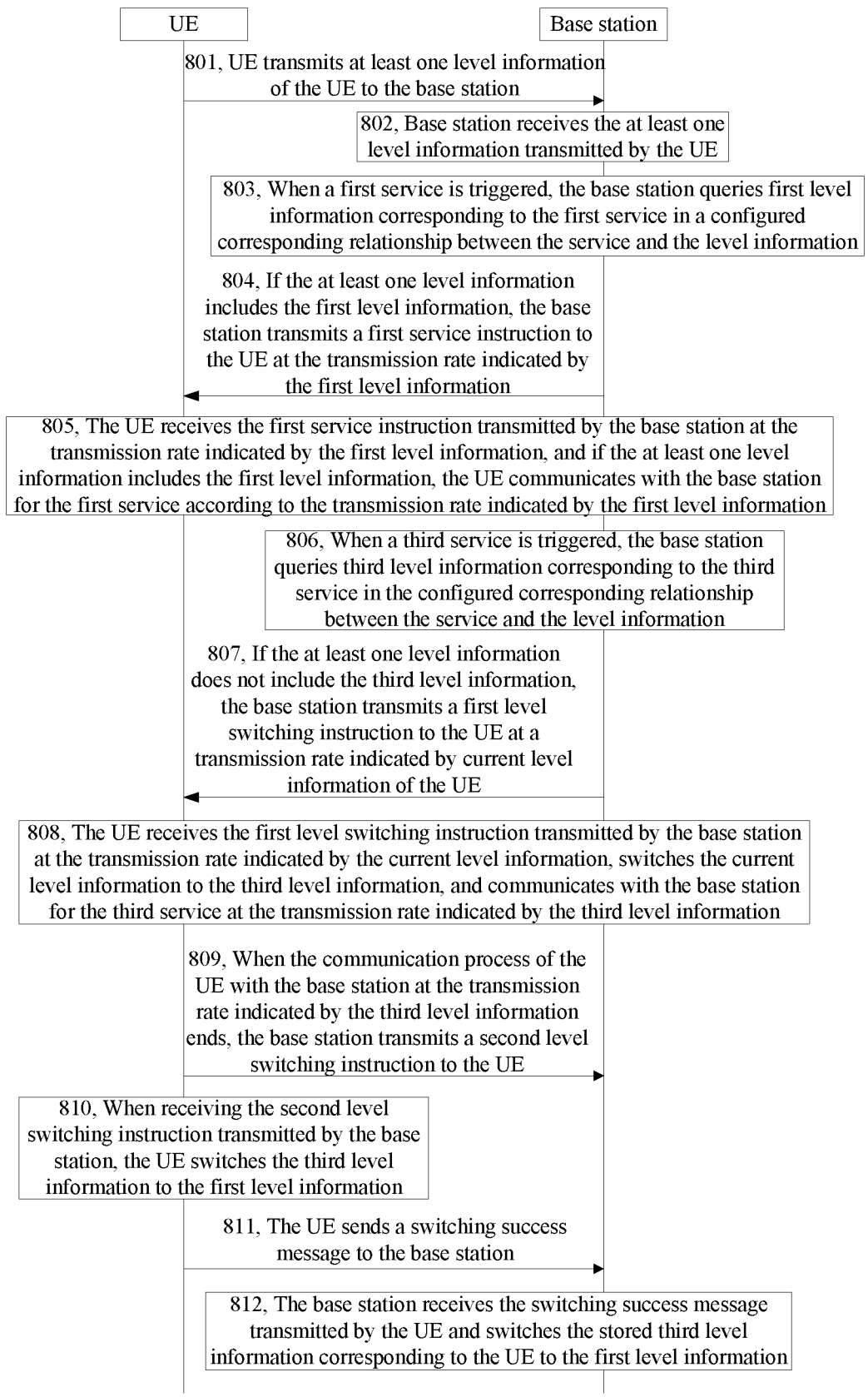
FIG. 8 is a flow chart of a communication method according to an eighth aspect of the present disclosure.

In the examples of the present disclosure, the two kinds of triggering scenes are described respectively. The examples shown in FIGS. 5 and 6 are described as triggering a service on the UE; and the examples shown in FIGS. 7 and 8 are described as triggering a service on the base station.

Figure 5:
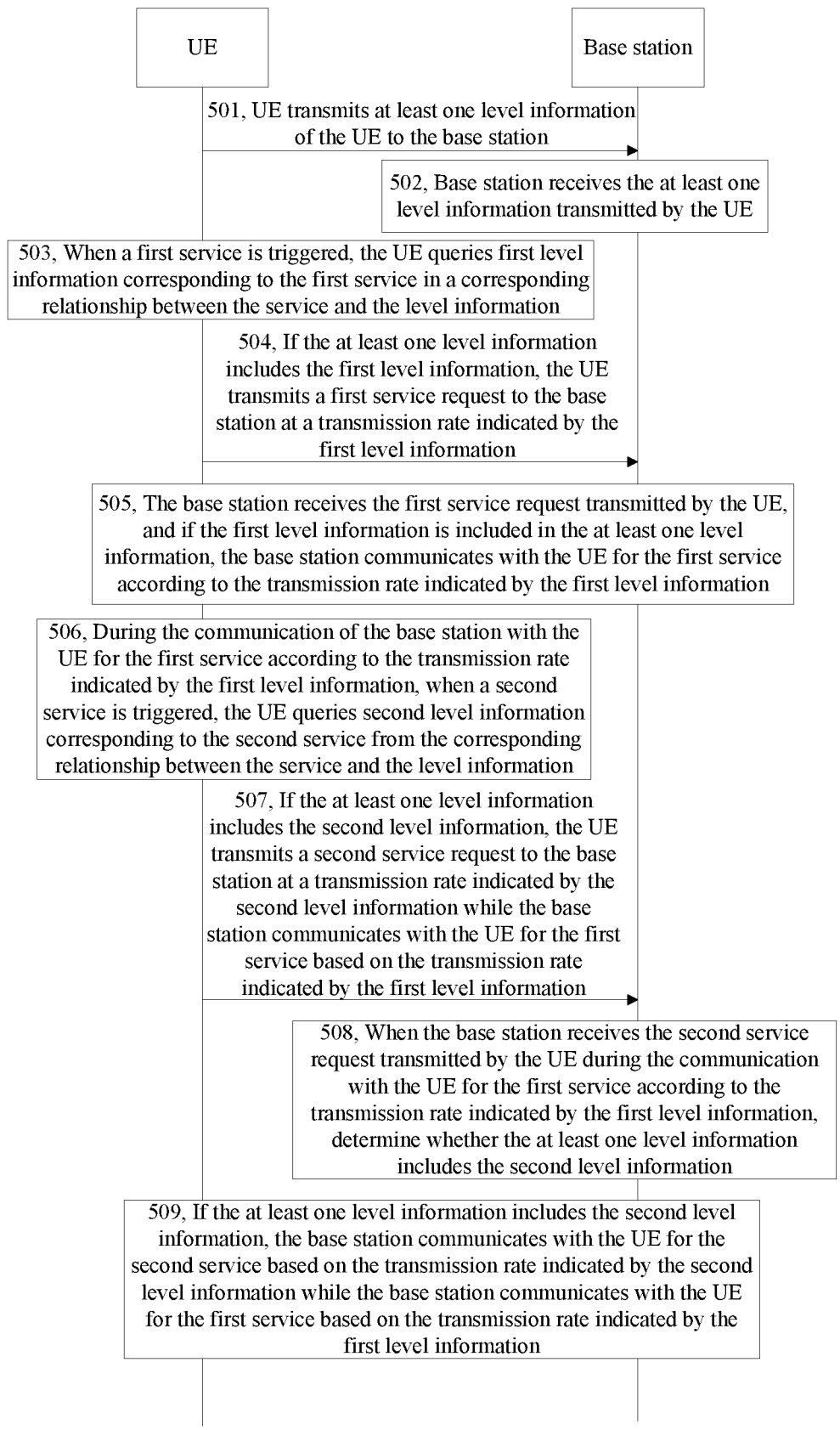
FIG. 5 is a flow chart of a communication method according to a fifth aspect of the present disclosure.

For example, FIG. 5 is a flow chart of a communication method according to a fifth aspect of the present disclosure. As shown in FIG. 5, this example is used for an interaction process between a base station and user equipment UE, and during the interaction process, different services may be performed concurrently. The method includes the following steps.

In step 501, the UE transmits at least one level information of the UE to the base station.

The level information is used to indicate the transmission rate of the UE for communication. The transmission rate includes an uplink transmission rate and a downlink transmission rate. In general, the level information is arranged in a chip of the UE by the vendor. Sometimes, the level information may also be used to indicate a modulation scheme, a communication delay upper limit, and the like.

In the case of the level information 1 and the level information 2, the maximum downlink transmission rate indicated by the level information 1 is 10 Mbps, the maximum uplink transmission rate indicated by the level information 1 is 5 Mbps, and the modulation scheme indicated by the level information 1 may be 16QAM (16 Quadrature Amplitude Modulation, 16-symbol quadrature amplitude modulation). The maximum downlink transmission rate indicated by the level information 2 is 50 Mbps, the maximum uplink transmission rate indicated by the level information 2 is 25 Mbps, and the modulation mode indicated by the level information 2 is 16QAM.

In the examples of the present disclosure, the corresponding relationship between the service and the level information includes all the level information of the UE and the corresponding service. Further, the corresponding relationship between the service and the level information, and the at least one level information to be transmitted are preconfigured in the UE so that the UE can read the at least one level information to be transmitted and transmit the at least one level information to the base station, and then both the UE and the base station can confirm the level information currently used by the UE.

In the examples of the present disclosure, the corresponding relationship between the service and the level information, and the at least one level information to be transmitted are not limited to certain scenarios. For example, the at least one level information to be transmitted is all the level information that the UE may have, including first level information, second level information and third level information. An example of the correspondence relationship between the service and the level information is shown in Table 1 below.

TABLE 1

| Level information | Service |
|---|---|
| First level information | Wireless broadband access service |
| Second level information | Reliable and low delay service |
| Third level information | Large-scale Internet of Things access service |

In the above Table 1, the wireless broadband access service may be a resource download service, the reliable and low delay service may be an Internet of Vehicles service, and the large-scale Internet of Things access service may be a sensor network service. Thus, in practice, the transmission rate indicated by the first level information may be higher than the transmission rate indicated by the second level information and/or the third level information.

It should be noted that the examples of the present disclosure do not limit the timing of triggering the transmission process. For example, the UE may actively send its own at least one level information to the base station after accessing to the base station, or the UE may return its own at least one level information to the base station when the base station sends a level information query to the UE.

In addition, it should be noted that since the UE has not yet agreed on the level information to be used with the base station when transmitting the at least one level information, the UE may transmit the at least one level information at a transmission rate indicated by any one of the configured level information.

In step 502, the base station receives the at least one level information transmitted by the UE.

In the examples of the present disclosure, each service and the corresponding level information have been pre-configured in the base station. However, the base station cannot confirm the level information used by the UE before receiving the level information transmitted by the UE. Therefore, based on this step, the base station can confirm the level information used by the UE and store the level information of the UE accordingly. The service supported by the UE can be confirmed in accordance with the stored level information of the UE during the subsequent communication.

In step 503, when a first service is triggered, the UE queries first level information corresponding to the first service in a corresponding relationship between the service and the level information.

In the examples of the present disclosure, the corresponding relationship between the service and the level information is embodied in the form that the service type corresponds to the level information. In this step, in order to determine the level information to be used for the first service, the UE may acquire the service type of the first service once the first service is triggered on the UE, and inquire the configured corresponding relationship between the service and the level information, to determine the first level information to be used by the first service.

The examples of the present disclosure may have various ways of triggering the service. For example, when it is detected that a user clicks a video resource download link, the wireless bandwidth access service is triggered. For another example, when a sensor data upload request is detected, a large-scale Internet of Things access service is triggered.

In step 504, if the at least one level information includes the first level information, the UE transmits a first service request to the base station at a transmission rate indicated by the first level information.

In this step, the first service request is used to request the base station to communicate with the UE according to the transmission rate indicated by the first level information. Through step 503, the UE may determine the first level information corresponding to the first service. To further determine whether the first level information may be used for communication, the UE determines whether the at least one level information includes the first level information. If the at least one level information includes the first level information, it means that the UE has transmitted the first level information to the base station, that is, the UE currently supports communication at the uplink transmission rate indicated by the first level information. The UE may generate a first service request based on the triggered first service and use the uplink transmission rate indicated by the first level information to send the first service request to the base station.

It should be noted that since the first service is directly triggered on the UE, the UE shall have configured the first service and the corresponding first level information. However, in step 501, the UE may not send the first level information to the base station. In this case, the examples of the present disclosure may provide processing manners of the UE. For example, in order to more reasonably complete the communication process of the first service, the UE may transmit the first service request to the base station using the uplink transmission rate indicated by the first level information, and the first service request carries the first level information. Thus, when receiving the first service request, the base station may extract the first level information, and communicate with the UE based on the first level information to complete the first service.

In step 505, the base station receives the first service request transmitted by the UE, and if the first level information is included in the at least one level information, the base station communicates with the UE for the first service according to the transmission rate indicated by the first level information.

Based on the above step 504, when receiving the first service request, the base station may determine the first level information corresponding to the first service according to the configuration and determine whether the first level information is included in the stored at least one level information, and if so, the base station confirms that it is possible to perform communication with the UE for the first service using a downlink transmission rate indicated by the first level information.

It is to be noted that the at least one level information may not include the first level information. For example, the transmission process of the above step 501 does not transmit the first level information, that is, the UE does not use the first level information currently. In this case the examples of the present disclosure may provide various the manners for processing the first service request by the base station. For example, in order to complete the first service, the base station may transmit the data requested according to the first service request to the UE using the downlink transmission rate indicated by the UE's current level information.

In step 506, during the communication of the base station with the UE for the first service according to the transmission rate indicated by the first level information, when a second service is triggered, the UE queries second level information corresponding to the second service from the corresponding relationship between the service and the level information.

In practice, the UE may trigger another service while carrying out one service. For example, the UE sends a data request to the vehicle bound to (paired with) the UE while downloading the data. Therefore, in order to enable one UE to concurrently carry out a plurality of services, during the communication between the base station and the UE at the first level information, when a second service is triggered, the UE may also execute the second service. In the step 506, the UE may acquire the service type of the second service and query the second level information corresponding to the service type of the second service from the configured corresponding relationship between the service and the level information.

In step 507, if the at least one level information includes the second level information, the UE transmits a second service request to the base station at a transmission rate indicated by the second level information while the base station communicates with the UE for the first service based on the transmission rate indicated by the first level information.

The second service request is for requesting the base station to communicate with the UE for the second service according to the transmission rate indicated by the second level information.

Based on the above step 506, the UE may determine the second level information corresponding to the second service, and in order to further determine whether the second level information may be used for communication, the UE judges whether the at least one level information includes the second level information. If the at least one level information includes the second level information, it means that the second level information has been transmitted to the base station before, and it also means that the UE supports communication at the uplink transmission rate indicated by the second level information currently. Thus, while the base station communicates with the UE using the first level information, the UE may send a second service request to the base station using the uplink transmission rate indicated by the second level information.

In step 508, when the base station receives the second service request transmitted by the UE during the communication with the UE for the first service according to the transmission rate indicated by the first level information, it is determined whether the at least one level information includes the second level information.

According to the above-mentioned step 507, the base station may receive the second service request, obtain the service type of the second service from the second service request, and acquire the second level information corresponding to the service type of the second service, and then judge whether the second level information is included in the stored at least one level information so as to determine whether it is possible to communicate with the UE using the second level information.

In step 509, if the at least one level information includes the second level information, the base station communicates with the UE for the second service based on the transmission rate indicated by the second level information while the base station communicates with the UE for the first service based on the transmission rate indicated by the first level information.

Based on the determination process of step 508, if the at least one level information includes the second level information, it indicates that the UE currently supports both the first level information and the second level information, thereby the base station may use the second level information to communicate with the UE for the second service while performing communication with the UE for the first service using the first level information.

During the above-mentioned parallel communication, the base station needs to allocate different transmission resources for the UE, and the examples of the present disclosure do not limit the specific allocation manner. For example, different time resources or frequency resources are allocated for different services of the UE.

In some cases, the original one level information may not meet the needs of the actual service, which may result in the poor implementation effect of the actual service.

In the examples of the present disclosure, the UE transmits the configured at least one level information to the base station, such that the UE and the base station can agree on the level information to be used in advance when they communicate with each other. When the first service is triggered, it is possible to determine that the first service should adopt the first level information according to the configured corresponding relationship between the service and the level information. If the first level information is included in the level information agreed by the base station and the UE in advance, it is possible to use the level information meeting the requirement of the first service when executing the first service, such that the implementation effect of the first service can be improved. Moreover, for different services, different level information may be used according to the configuration, thereby meeting a variety of service demands under the 5G scenario.

In addition, during the communication of the UE with the base station for the first service, if the second service is triggered, and the at least one level information which has been transmitted by the UE includes the second level information corresponding to the second service, it is possible to use the second level information to perform the communication process for the second service while performing the communication process for the first service using the first level information. Thus, a plurality of services can be concurrently performed on the same UE, and the efficiency of performing the services can be high.

The example shown in FIG. 5 implements the process of using different level information on one UE and concurrently carrying out different services, which not only satisfies the demands for transmission rate by individual services, but also has high efficiency of performing the services. In order to save the transmission resources, the UE may also perform different services serially. For example, FIG. 6 is a flow chart of a communication method according to a sixth aspect of the present disclosure. As shown in FIG. 6, this example is used for an interaction process between a base station and user equipment UE, and specifically includes the following steps.

In step 601, the UE transmits at least one level information to the base station, each of which is used to indicate a transmission rate of the UE for communication.

This step is the same as the above-described step 501.

The transmission procedure of this step is intended to inform the base station of the level information currently supported by the UE. In order to prevent the UE from occupying more transmission resources during the communication process, the UE may send one level information to the base station to indicate that only this level information is currently supported for communication. In addition, since the communication delays required by different services are different, the upper limits of the communication delay indicated by the level information corresponding to different services are different. In order to reduce the power consumption of the UE to maintain a longer standby time, the UE may send level information having a relatively high upper limit of the communication delay to the base station so that the UE itself maintains a relatively large transmission and reception interval. The examples of the present disclosure include an example of transmitting the first level information indicating the highest upper limit of the communication delay.

In step 602, the base station receives the at least one level information transmitted by the UE.

This step is the same as the above-mentioned step 502 and is not repeated.

In step 603, when a first service is triggered, the UE queries first level information corresponding to the first service in a corresponding relationship between the service and the level information.

This step is the same as the above-mentioned step 503 and is not repeated.

In step 604, if the at least one level information includes the first level information, the UE sends a first service request to the base station at a transmission rate indicated by the first level information.

This step is the same as the above-mentioned step 504 and is not repeated.

In step 605, the base station receives the first service request transmitted by the UE at the transmission rate indicated by the first level information, and if the at least one level information includes the first level information, the base station communicates with the UE for the first service according to the transmission rate indicated by the first level information.

This step is the same as the above-mentioned step 505 and is not repeated.

In step 606, during the communication of the base station with the UE for the first service according to the transmission rate indicated by the first level information, when a third service is triggered, the UE queries third level information corresponding to third service in the corresponding relationship between the service and the level information.

This step is similar to step 506 in the example shown in FIG. 5, and the difference therebetween lies in that in the present example, the third service is triggered, and the query process is querying the third level information corresponding to the third service.

In step 607, if the third level information is not included in the at least one level information, the UE switches the current level information to the third level information.

By the above step 606, the UE may query the third level information corresponding to the third service. Therefore, in order to further confirm whether or not the third level information may be used for communication currently, the UE judges whether the at least one level information includes the third level information. If the at least one level information does not include the third level information, it indicates that the UE does not support communication by the third level information currently. Therefore, in order to meet the requirements of the third service, the UE may actively switch the current level information to the third level information.

It is to be noted that when the above switching procedure is completed, the level information currently supported by the UE is only the third level information. In addition, if it is determined that the at least one level information does not include the third level information and the first service has not been completed yet, the timing of switching may vary. For example, the third service is placed in a waiting state, and when the first service is completed, the switching process is performed. For another example, the first service is placed in a waiting state, and when the third service is completed, the communication process of the first service is continued with the first level information.

The at least one level information may also include third level information. At this time, the UE may communicate directly using the third level information, for detail please see the above step 604.

In step 608, the UE transmits a third service request to the base station at a transmission rate indicated by the third level information, and the third service request may carry the third level information.

When the UE completes the process of switching the level information, the UE may generate a third service request based on the triggered third service and the queried third level information, and send the third service request to the base station. The third service request is for requesting the base station to communicate with the UE for the third service according to the transmission rate indicated by the third level information.

In step 609, when receiving the third service request carrying the third level information sent by the UE at the transmission rate indicated by the third level information, the base station performs communication with the UE for the third service at the transmission rate indicated by the third level information.

In this step, when receiving the third service request, the base station may extract the third level information, determine that the UE has currently switched to the third level information, and based on the indication of the third service request, the base station may communicate with the UE for the third service at the downlink transmission rate instructed by the extracted third level information.

In step 610, when the communication process of the base station with the UE according to the transmission rate indicated by the third level information is completed, the UE may switch the third level information to the first level information.

Since the power consumption may be minimum when the UE is standby at the first level information, in addition to the first level information, when the corresponding service is completed with any level information (e.g., the resource downloading is completed), the UE may switch the level information to the first level information.

In step 611, the UE transmits a level switching request to the base station, the level switching request for instructing the base station to switch the stored third level information corresponding to the UE to the first level information.

In this step, in order to make the subsequent communication process between the base station and the UE normal, and avoid exceeding a capability range of the downlink transmission rate indicated by the third level information currently supported by the UE when the base station adopts the downlink transmission rate of the first level information to communicate with the UE, the UE may need to indicate to the base station that the current level information has been switched to the first level information, thereby the UE sends a level switching request to the base station.

It should be noted that the purpose of the switching process is to enable the UE to reside or stay in the state corresponding to the first level information and wait for communication of the next service, rather than immediately using the first level information to communicate with the base station for a certain service, and thus it further indicates that the switching process does not involve any service. Therefore, the present disclosure does not limit the level information used in the transmission of the level switching request by the UE. For example, the UE may transmit the level switching request using the switched level information such as first level information.

In step 612, when receiving the level switching request transmitted by the UE, the base station switches the stored third level information corresponding to the UE to the first level information.

When the base station receives the level switching request, the base station may query the stored third level information corresponding to the UE, and modify the third level information corresponding to the UE to the first level information, so as to ensure the communication with the UE using the first level information at any time.

In some cases, the original one level information may not meet the needs of the actual service, which may result in the poor implementation effect of the actual service.

In the examples of the present disclosure, the UE transmits the configured at least one level information to the base station, such that the UE and the base station can agree on the level information to be used in advance when they communicate with each other. When the first service is triggered, it is possible to determine that the first service should adopt the first level information according to the configured corresponding relationship between the service and the level information. If the first level information is included in the level information agreed by the base station and the UE in advance, it is possible to use the level information meeting the requirement of the first service when executing the first service, such that the implementation effect of the first service can be improved. Moreover, for different services, different level information may be used according to the configuration, thereby meeting a variety of service demands under the 5G scenario.

In addition, during the communication of the UE with the base station for the first service, if the second service is triggered, and the at least one level information that has been transmitted by the UE does not include the second level information corresponding to the second service, it is possible to switch the current level information of the UE to the second level information so that the two parties can use the second level information to carry out the communication process of the second service, thereby a plurality of services can be serially carried out on the same UE, which reduces the occupation of the transmission resources. In addition, when the second service is completed, the UE may switch to the first level information to ensure that the UE uses the first level information having the highest communication delay upper limit to standby, thereby maintaining a relatively large reception and transmission interval and reducing the power consumption.

FIG. 7 is a flow chart of a communication method according to a seventh aspect of the present disclosure. As shown in FIG. 7, this example is used for an interaction between a base station and a UE. During the interaction, different services are supported and are performed concurrently. The method includes the following steps.

In step 701, the UE transmits at least one level information of the UE to the base station, each of which is used to indicate a transmission rate of the UE for communication.

This step is the same as the above-mentioned step 501, and is not described again.

In step 702, the base station receives the at least one level information transmitted by the UE.

This step is the same as the above-mentioned step 502 and is not repeated.

In step 703, when a first service is triggered, the base station queries first level information corresponding to the first service in a configured corresponding relationship between the service and the level information.

In this step, when the first service with the UE is triggered at the base station side, the service type of the first service may be acquired, and the level information corresponding to the service type of the first service is inquired according to the configuration, so as to determine that the first service should use the first level information.

The examples of the present disclosure provide various manners of triggering the service. For example, when the data pushed by the server to the UE is received, the wireless bandwidth access service is triggered. For another example, when a sensor data acquisition instruction by the server to the UE is received, the large-scale Internet of Things access service is triggered.

In step 704, if the at least one level information includes the first level information, the base station transmits a first service instruction to the UE at the transmission rate indicated by the first level information.

In this step, the first service instruction is used to instruct the UE to communicate with the base station for the first service according to the transmission rate indicated by the first level information. In step 703, the base station may determine the first level information corresponding to the first service. In order to further determine whether the first level information may be used for communication with the UE, the base station determines whether the first level information is included in the at least one level information. If the first level information is included in the at least one level information, it indicates that the UE has transmitted the first level information to the base station before, that is, the UE currently supports the communication with the base station at the downlink rate indicated by the first level information. Therefore, the base station may generate a first service instruction based on the triggered first service, and use the downlink transmission rate indicated by the first level information to transmit the first service instruction to the UE.

It is to be noted that the at least one level information may not include the first level information. For example, the transmission process of the above step 701 does not transmit the first level information, that is, the UE does not use the first level information currently. In this case, the present disclosure provides manners of processing the first service by the base station. For example, in order to complete the first service, the base station transmits the first service instruction to the UE using the downlink transmission rate indicated by the UE's current level information.

In step 705, the UE receives the first service instruction transmitted by the base station at the transmission rate indicated by the first level information, and if the at least one level information includes the first level information, the UE communicates with the base station for the first service according to the transmission rate indicated by the first level information.

Based on the above step 704, when the UE receives the first service instruction, it is possible to determine the first level information corresponding to the first service according to the configuration and determine whether the first level information is included in the transmitted at least one level information, and if so, it is confirmed that the communication of the first service may be performed with the base station using the uplink transmission rate indicated by the first level information.

It should be noted that since the service is generated for the UE, the UE should have configured the first level information corresponding to the first service. However, the at least one level information may not include the first level information. In this case, in order to properly complete the first service, the UE may perform the communication of the first service using the uplink transmission rate indicated by the queried first level information.

In step 706, during the communication process of the UE with the base station for the first service according to the transmission rate indicated by the first level information, when a second service is triggered, the base station inquires second level information corresponding to the second service in the configured corresponding relationship between the service and the level information.

In practice, the base station may trigger another service with the UE while carrying out a service with the UE. For example, when receiving a video resource uploaded by the UE, a sensor data acquisition instruction by a server for the UE is received. Therefore, in order to enable the base station to concurrently carry out a plurality of services with one UE, during the communication between the base station and the UE using the first level information, when a second service is triggered, the base station may also perform the second service with the UE. In this step 706, the base station may acquire the service type of the second service and inquire the second level information corresponding to the service type of the second service according to the configuration to determine that the second level information should be used when performing the second service.

In step 707, if the at least one level information includes the second level information, the base station transmits a second service instruction to the UE at the transmission rate indicated by the second level information while the UE performs communication with the base station for the first service according to the transmission rate indicated by the first level information.

The second service instruction is used to instruct the UE to communicate with the base station for the second service according to the transmission rate indicated by the second level information.

Based on the above step 706, the base station may determine the second level information corresponding to the second service. To further determine whether the second level information may be used for communication with the UE, the base station determines whether the stored at least one level information of the UE includes the second level information. If the at least one level information of the UE includes the second level information, it indicates that the UE supports communication with the base station at the downlink transmission rate indicated by the second level information currently. Therefore, the base station may transmit a second service instruction to the UE using the downlink transmission rate indicated by the second level information while the UE communicates with the base station according to the transmission rate indicated by the first level information.

In step 708, during the communication of the UE with the base station for the first service according to the transmission rate indicated by the first level information, when the UE receives the second service instruction transmitted by the base station at the transmission rate indicated by the first level information, it is determined whether the second level information is included in the at least one level information.

According to the above step 707, the UE may receive the second service instruction, obtain the service type of the second service from the second service instruction, and inquire the second level information corresponding to the service type of the second service according to the configuration and then determine whether the transmitted at least one level information includes the second level information, so as to determine whether communication with the base station may be performed using the uplink transmission rate indicated by the second level information.

In step 709, if the at least one level information includes the second level information, the UE communicates with the base station for the second service at the transmission rate indicated by the second level information while performing the communication of the first service with the base station according to the transmission rate indicated by the first level information.

Based on the determination process of the above step 708, if the at least one level information includes the second level information, it indicates that the UE currently supports both the first level information and the second level information. Therefore, the UE may use the second level information to carry out the communication process of the second service with the base station while performing the communication process of the first service with the base station using the first level information.

In some cases, the original one level information may not meet the needs of the actual service, which result in that the poor implementation effect of the actual service.

In the examples of the present disclosure, the UE transmits the configured at least one level information to the base station, such that the UE and the base station can agree on the level information to be used in advance when they communicate with each other. When the first service is triggered, it is possible to determine that the first service should adopt the first level information according to the configured corresponding relationship between the service and the level information. If the first level information is included in the level information agreed by the base station and the UE in advance, it is possible to use the level information meeting the requirement of the first service when executing the first service, such that the implementation effect of the first service can be improved. Moreover, for different services, different level information may be used according to the configuration, thereby meeting a variety of service demands under the 5G scenario.

In addition, during the communication of the UE with the base station for the first service, if the second service is triggered and the at least one level information that has been transmitted by the UE includes the second level information corresponding to the second service, it is possible to use the second level information to perform the communication process of the second service while performing the communication process of the first service using the first level information, so that a plurality of services can be concurrently performed on the same UE, and the efficiency of performing the service is high.

The example shown in FIG. 7 implements the process of using different level information on one UE and concurrently carrying out different services, which not only satisfies the demands for transmission rates by individual services, but also has a high efficiency of performing the services. In order to save the transmission resources, the UE may also perform different services serially. For example, FIG. 8 is a flow chart of a communication method according to an eighth aspect of the present disclosure. As shown in FIG. 8, this example is used for an interaction process between a base station and user equipment UE, and includes the following steps.

In step 801, the UE transmits at least one level information of the UE to the base station, each of the at least one level information being used to indicate a transmission rate of the UE for communication.

This step is the same as the above step 701.

In order to save the transmission resources and reduce the power consumption of the UE so as to maintain a relatively long standby time, the examples of the present disclosure are described by using an example of transmitting first level information indicating a maximum upper limit of the communication delay.

In step 802, the base station receives the at least one level information transmitted by the UE.

This step is the same as the above-mentioned step 702 and is not repeated.

In step 803, when a first service is triggered, the base station queries first level information corresponding to the first service in a configured corresponding relationship between the service and the level information.

This step is the same as the above-mentioned step 703 and is not repeated.

In step 804, if the at least one level information includes the first level information, the base station transmits a first service instruction to the UE at the transmission rate indicated by the first level information.

This step is the same as the above-mentioned step 704 and is not repeated.

In step 805, the UE receives the first service instruction transmitted by the base station at the transmission rate indicated by the first level information, and if the at least one level information includes the first level information, the UE communicates with the base station for the first service according to the transmission rate indicated by the first level information.

This step is the same as the above-mentioned step 705 and is not repeated.

In step 806, when a third service is triggered, the base station queries third level information corresponding to the third service in the configured corresponding relationship between the service and the level information.

This step is similar to the above step 706, and the difference lies in that in step 806, the third service is triggered, and thus the query process is querying the third level information corresponding to the third service.

In step 807, if the at least one level information does not include the third level information, the base station transmits a first level switching instruction to the UE at a transmission rate indicated by current level information of the UE.

By the above step 806, the base station may query the third level information corresponding to the third service, and therefore, in order to further confirm whether or not the third level information may be used to perform communication with the UE currently, the base station determines whether the stored at least one level information of the UE includes the third level information. If the stored at least one level information of the UE does not include the third level information, it indicates that the UE does not support communication with the base station with the third level information. Thereby, in order to comply with the requirements of the third service, the base station may use the downlink transmission rate indicated by the current level information of the UE to transmit the first level switching instruction to the UE. The first level switching instruction is used to instruct the UE to switch the current level information to the third level information and to communicate with the base station for the third service at a transmission rate indicated by the third level information.

The at least one level information may also include the third level information. At this time, the base station may communicate with the UE directly using the third level information, for detail please see the above step 804.

In step 808, the UE receives the first level switching instruction transmitted by the base station at the transmission rate indicated by the current level information. The UE switches the current level information to the third level information, and communicates with the base station for the third service at the transmission rate indicated by the third level information.

By the above-described step 807, the UE may receive the first level switching instruction and switch the current level information to the third level information based on the third level information corresponding to the third service queried according to the configuration, and based on the instruction of the first level switching instruction, so as to perform the communication process with the base station for the third service at an uplink transmission rate indicated by the third level information.

In step 809, when the communication process of the UE with the base station at the transmission rate indicated by the third level information ends, the base station may transmits second level switching instruction to the UE.

The second level switching instruction may be used to instruct the UE to switch the third level information to the first level information.

The power consumption is minimum when the UE is standby using the first level information, therefore, in addition to the first level information, when the corresponding service between the base station and the UE is completed by using any level information, the base station may transmit the second level switching instruction to the UE such that the UE switches the current level information to the first level information.

It should be noted that the purpose of the switching process is to enable the UE to reside in the state corresponding to the first level information and wait for communication of the next service, rather than the base station immediately uses the first level information to communicate with the UE for a certain service, thereby further indicating that the switching process does not involve any service. Therefore, the base station may use any level information of the at least one level information transmitted by the UE during transmission.

In step 810, when receiving the second level switching instruction transmitted by the base station, the UE switches the third level information to the first level information.

By the above step 809, the UE may receive the second level switching instruction and switch the currently supported third level information to the first level information to ensure that the UE can communicate with the base station using the first level information at any time.

In step 811, the UE sends a switching success message to the base station.

Based on the above step 810, the UE has completed the switching procedure. In order to make the base station communicate with the UE using the first level information at any time, the UE may transmit the switching success message to the base station. The switching success message may be used to instruct the base station to switch the stored third level information corresponding to the UE to the first level information.

In step 812, the base station receives the switching success message transmitted by the UE and switches the stored third level information corresponding to the UE to the first level information.

By receiving the switching success message, the base station may confirm that the current level information of the UE has been switched to the first level information. Therefore, in this step, the base station changes the stored third level information corresponding to the UE to the first level information, so as to ensure that the UE and the base station can communicate with each other at any time using the transmission rate indicated by the first level information.

Sometimes, the original one level information may not meet the needs of the actual service, and may result in the poor actual service.

In the examples of the present disclosure, the UE transmits the configured at least one level information to the base station, such that the UE and the base station can agree on the level information to be used in advance when they communicate with each other. When the first service is triggered, it is possible to determine that the first service should adopt the first level information according to the configured corresponding relationship between the service and the level information. If the first level information is included in the level information agreed by the base station and the UE in advance, it is possible to use the level information meeting the requirement of the first service when executing the first service, such that the implementation effect of the first service can be improved. Moreover, for different services, different level information may be used according to the configuration, thereby meeting a variety of service demands under the 5G scenario.

In addition, during the communication of the UE with the base station for the first service, if the second service is triggered and the at least one level information that has been transmitted by the UE does not include the second level information corresponding to the second service, it is possible to switch the UE's current level information to the second level information so that the two parties can use the second level information to carry out the communication process of the second service. Thereby, a plurality of services can be serially carried out on the same UE, and the occupation of the transmission resources is reduced. In addition, when the second service is completed, the UE may switch to the first level information to ensure that the UE uses the first level information having the highest communication delay upper limit to standby, thereby maintaining a large reception and transmission interval to reduce the power consumption.

Sometimes, the parallel data commutation and serial data communication may be mixed for the data communication between the UE and the base station. For example, when data dependencies exist between the second service and the third service, the data for the first service may be transmitted in parallel with either the second service or the third service but may not be transmitted in parallel with both the second service and the third service. The data for second service and the third service may be transmitted serially because some data dependencies may exist between the data for the second service and the third service.

Sometimes, the parallel transmission and the serial transmission may be switched. For example, as described above, the data for the first service may not be transmitted in parallel with both the data for the second service and the third service due the data dependencies between them. However, when the data dependencies no longer exist, the data for the first service, the second service and the third service may be transmitted in parallel.

Figure 9A:
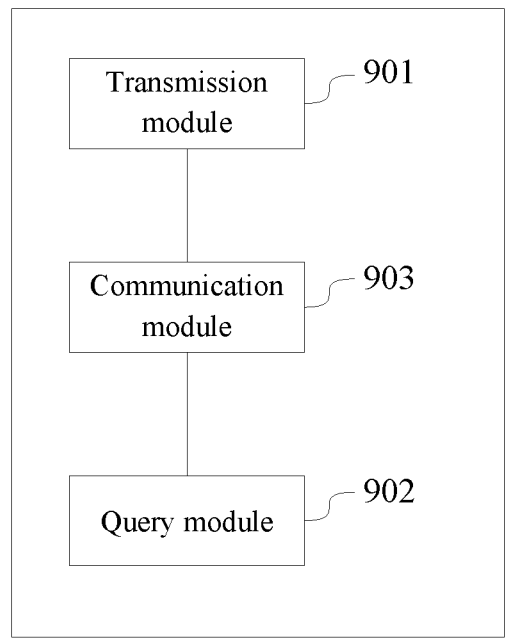
FIG. 9A is a block diagram of a communication device according to a ninth aspect of the present disclosure.

FIG. 9A is a block diagram of a communication device according to a ninth aspect of the present disclosure. Referring to FIG. 9A, the device includes a transmission module 901, a query module 902, and a communication module 903.

The transmission module 901 is configured to transmit at least one level information of a UE to a base station, the level information being used for indicating a transmission rate of the UE for communication.

The query module 902 may be configured to, when a first service is triggered, query first level information corresponding to the first service in a corresponding relationship between the service and the level information of the UE.

The communication module 903 may be configured to, if at least one level information includes the first level information, transmit a first service request to the base station at a transmission rate indicated by the first level information, the first service request being used for requesting the base station to communicate with the UE for the first service according to the transmission rate indicated by the first level information.

Sometimes, the original one level information may not meet the needs of the actual service, resulting in the poor actual service.

In the examples of the present disclosure, the UE transmits the at least one level information that has been configured to the base station so that the UE and the base station can agree on the level information to be used in advance when the two parties communicate. When the first service is triggered, it is possible to determine that the first service should use the first level information according to the configured corresponding relationship between the service and the level information. If the first-level information is included in the level information agreed upon by the base station and the UE in advance, it is possible to use the level information meeting the requirement of the first service when executing the first service, such that the implementation effect of the first service can be improved. Moreover, for different services, different level information may be used according to the configuration, thereby meeting a variety of service demands under the 5G scenario.

In a possible implementation, the query module 902 is further configured to, during the communication of the base station with the UE for the first service according to the transmission rate indicated by the first level information, when a second service is triggered, query second level information corresponding to the second service in the corresponding relationship between the service and the level information of the UE.

The communication module 903 may be further configured to, if the at least one level information includes the second level information, transmit a second service request to the base station at a transmission rate indicated by the second level information while the base station communicates with the UE at the transmission rate indicated by the first level information, the second service request being used for the base station to communicate with the UE for the second service according to the transmission rate indicated by the second level information.

Figure 9B:
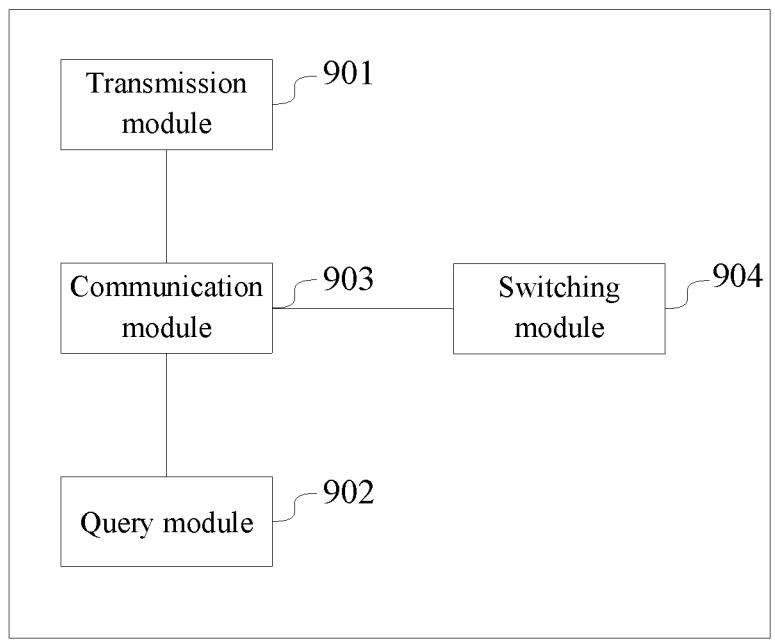
FIG. 9B is a block diagram of a communication device according to a tenth aspect of the present disclosure.

In a possible implementation, based on the device configuration of FIG. 9A, referring to FIG. 9B, the device further includes a switching module 904.

The query module 902 may be further configured to, when a third service is triggered, query third level information corresponding to the third service in the corresponding relationship between the service and the level information of the UE.

The switching module 904 may be configured to, if the third level information is not included in the at least one level information, switch current level information of the UE to the third level information.

The communication module 903 may be configured to transmit a third service request to the base station at a transmission rate indicated by the third level information, the third service request carrying the third level information, the third service request being used to request the base station to communicate with the UE for the third service according to the transmission rate indicated by the third level information.

In a possible implementation, the switching module 904 may be further configured to, when the communication of the base station with the UE for the third service according to the transmission rate indicated by the third level information is completed, switch the third level information to the first level information.

The transmission module 901 may be further configured to transmit a level switching request to the base station, the level switching request being used for instructing the base station to switch the stored third level information corresponding to the UE to the first level information.

In a possible implementation, the level information may be also used to indicate an upper limit of the communication delay of the UE.

All of the alternative technical solutions described above may be combined in any way to form alternative examples of the present disclosure, which are elaborated herein.

Figure 10A:
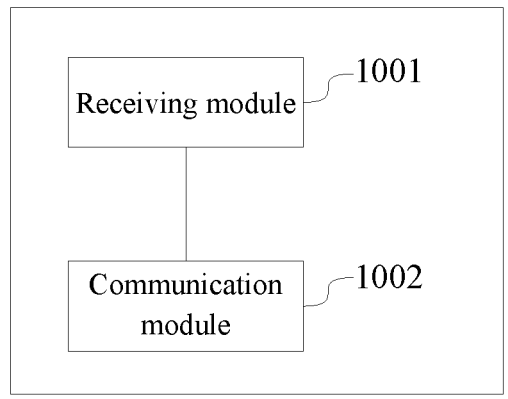
FIG. 10A is a block diagram of a communication device according to an eleventh aspect of the present disclosure.

FIG. 10A is a block diagram of a communication device according to an eleventh aspect of the present disclosure. Referring to FIG. 10A, the device includes a receiving module 1001 and a communication module 1002.

The receiving module 1001 may be configured to receive at least one level information transmitted by user equipment UE, the level information being used for indicating a transmission rate of the UE for communication.

The communication module 1002 may be configured to receive a first service request transmitted by the UE at a transmission rate indicated by the first level information, and if at least one level information includes the first level information, perform communication with the UE for the first service according to the transmission rate indicated by the first level information, the first level information being level information corresponding to the first service.

Sometimes, the original one level information may not meet the needs of the actual service, resulting in the poor actual service.

In the examples of the present disclosure, the UE transmits the at least one level information that has been configured to the base station so that the UE and the base station can agree on the level information to be used in advance when the two parties communicate. When the first service is triggered, it is possible to determine that the first service should adopt the first level information according to the configured corresponding relationship between the service and the level information. If the first level information is included in the level information agreed by the base station and the UE in advance, it is possible to use the level information meeting the requirement of the first service when executing the first service, such that the implementation effect of the first service can be improved. Moreover, for different services, different level information may be used according to the configuration, thereby meeting a variety of service demands under the 5G scenario.

Figure 10B:
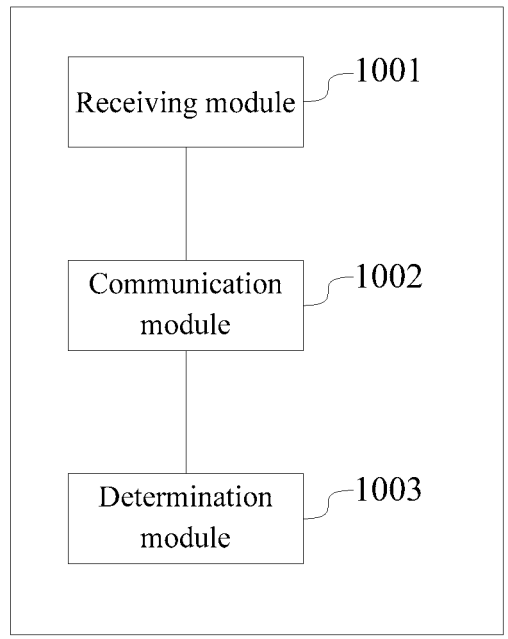
FIG. 10B is a block diagram of a communication device according to a twelfth aspect of the present disclosure.

In a possible implementation, based on the device configuration of FIG. 10A, referring to FIG. 10B, the device further includes a determination module 1003.

The determination module 1003 may be configured to, during the communication with the UE for the first service according to the transmission rate indicated by the first level information, when a second service request transmitted by the UE at a transmission rate indicated by the second level information is received, determine whether the at least one level information includes second level information, the second level information being level information corresponding to the second service.

The communication module 1002 may be further configured to, if the at least one level information includes the second level information, perform communication with the UE for the second service according to the transmission rate indicated by the second level information while communicating with the UE for the first service at the transmission rate indicated by the first level information.

In a possible implementation, the communication module 1002 may be further configured to, when a third service request transmitted by the UE at a transmission rate indicated by the third level information is received, communicate with the UE for the third service according to the transmission rate indicated by the third level information, the third service request carrying the third level information.

Figure 10C:
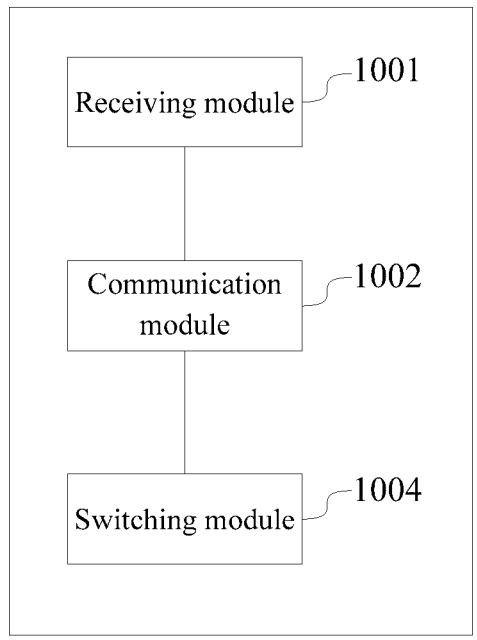
FIG. 10C is a block diagram of a communication device according to a thirteenth aspect of the present disclosure.

In a possible implementation, based on the device configuration of FIG. 10A, referring to FIG. 10C, the device further includes a switching module 1004.

The switching module 1004 may be configured to, when a level switching request transmitted by the UE is received, switch the stored third level information corresponding to the UE to the first level information.

In a possible implementation, the level information may be also used to indicate an upper limit of the communication delay of the UE.

All of the alternative technical solutions described above may be combined in any way to form alternative examples of the present disclosure, which are elaborated herein.

Figure 11A:
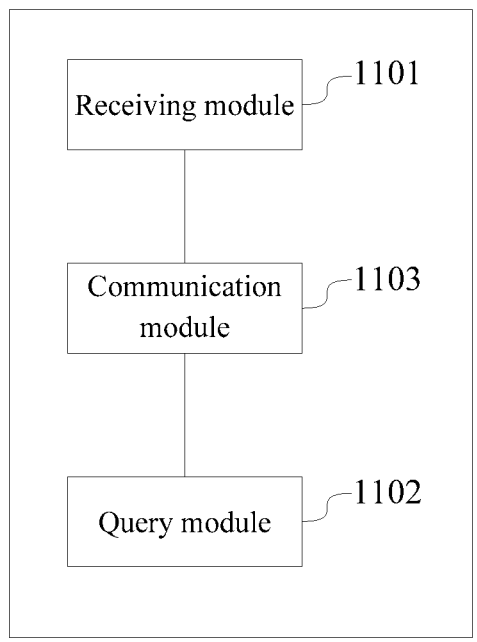
FIG. 11A is a block diagram of a communication device according to a fifteenth aspect of the present disclosure.

FIG. 11A is a block diagram of a communication device according to a fifteenth aspect of the present disclosure. Referring to FIG. 11A, the device includes: a receiving module 1101, a query module 1102, and a communication module 1103.

The receiving module 1101 may be configured to receive at least one level information transmitted by the UE, the level information being used for indicating a transmission rate of the UE for communication.

The query module 1102 may be configured to, when a first service is triggered, query first level information corresponding to the first service in a configured corresponding relationship between the service and the level information.

The communication module 1103 may be configured to, if the at least one level information includes the first level information, transmit a first service instruction to the UE at a transmission rate indicated by the first level information, the first service instruction being used for instructing the UE to communicate with the base station for the first service according to the transmission rate indicated by the first level information.

Sometimes, the original one level information may not meet the needs of the actual service, resulting in the poor actual service.

In the examples of the present disclosure, the UE transmits the configured at least one level information to the base station, such that the UE and the base station can agree on the level information to be used in advance when they communicate with each other. When the first service is triggered, it is possible to determine that the first service should adopt the first level information according to the configured corresponding relationship between the service and the level information. If the first level information is included in the level information agreed by the base station and the UE in advance, it is possible to use the level information meeting the requirement of the first service when executing the first service, such that the implementation effect of the first service can be improved. Moreover, for different services, different level information may be used according to the configuration, thereby meeting a variety of service demands under the 5G scenario.

In a possible implementation, the query module 1102 may be further configured to, during the communication of the UE with the base station according to the transmission rate indicated by the first level information, when a second service is triggered, query second level information corresponding to the second service in the configured corresponding relationship between the service and the level information.

The communication module 1103 may be further configured to, if the at least one level information includes the second level information, transmit a second service instruction to the UE at a transmission rate indicated by the second level information while the UE performs communication with the base station for the first service according to the transmission rate indicated by the first level information, the second service instruction being used for indicating the UE to perform communication with the base station for the second service according to the transmission rate indicated by the second level information.

Figure 11B:
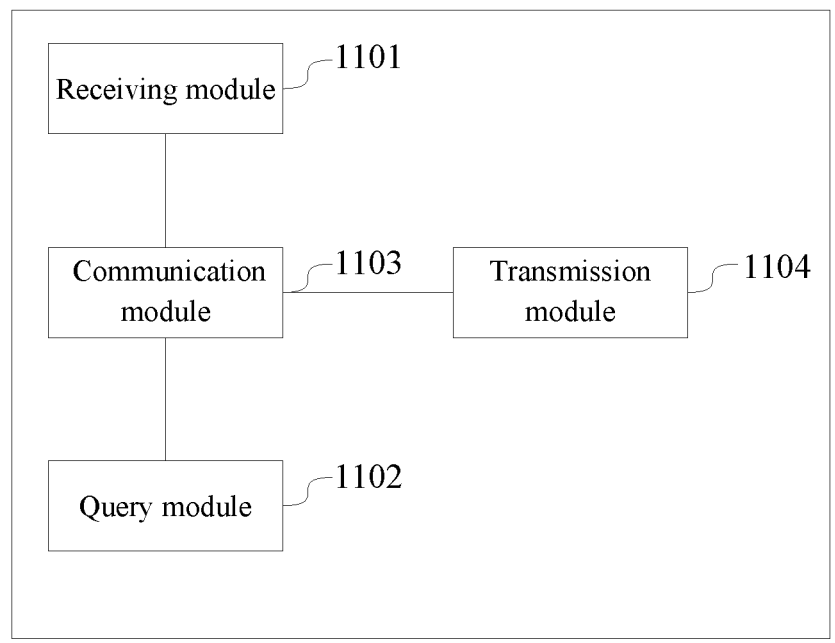
FIG. 11B is a block diagram of a communication device according to a sixteenth aspect of the present disclosure.

In a possible implementation, based on the device configuration of FIG. 11A, referring to FIG. 11B, the device further includes a transmission module 1104.

The query module 1102 may be further configured to, when a third service is triggered, query third level information corresponding to the third service in the configured corresponding relationship between the service and the level information.

The transmission module 1104 may be configured to, if the at least one level information does not include the third level information, transmit a first level switching instruction to the UE at a transmission rate indicated by current level information of the UE, the first level switching instruction being used for instructing the UE to switch the current level information to the third level information and to communicate with the base station for the third service at a transmission rate indicated by the third level information.

In a possible implementation, the transmission module 1104 may be further configured to, when the communication of the UE with the base station for the third service at the transmission rate indicated by the third level information is completed, transmit a second level switching instruction to the UE, the second level switching instruction being used for instructing the UE to switch the third level information to the first level information.

The receiving module 1101 is also configured to receive a switching success message transmitted by the UE, and to switch the stored third level information corresponding to the UE to the first level information.

In one possible implementation, the level information is also used to indicate an upper limit of the communication delay of the UE.

All of the alternative technical solutions described above may be combined in any way to form alternative examples of the present disclosure, which are elaborated herein.

Figure 12A:
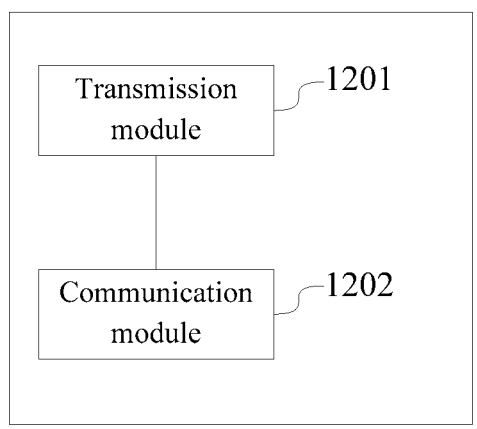
FIG. 12A is a block diagram of a communication device according to a seventeenth aspect of the present disclosure.

FIG. 12A is a block diagram of a communication device according to a seventeenth aspect of the present disclosure. Referring to FIG. 12A, the device includes: a transmission module 1201 and a communication module 1202.

The transmission module 1201 may be configured to transmit at least one level information of a UE to a base station, the level information being used for indicating a transmission rate of the UE for communication.

The communication module 1202 may be configured to receive a first service instruction transmitted by the base station at a transmission rate indicated by the first level information, and if the at least one level information includes the first level information, communicate with the base station for first service at a transmission rate indicated by the first level information, the first level information being level information corresponding to the first service.

Sometimes, the original one level information may not meet the needs of the actual service, resulting in the poor actual service.

In the examples of the present disclosure, the UE transmits the configured at least one level information to the base station, such that the UE and the base station can agree on the level information to be used in advance when they communicate with each other. When the first service is triggered, it is possible to determine that the first service should adopt the first level information according to the configured corresponding relationship between the service and the level information. If the first level information is included in the level information agreed by the base station and the UE in advance, it is possible to use the level information meeting the requirement of the first service when executing the first service, such that the implementation effect of the first service can be improved. Moreover, for different services, different level information may be used according to the configuration, thereby meeting a variety of service demands under the 5G scenario.

Figure 12B:
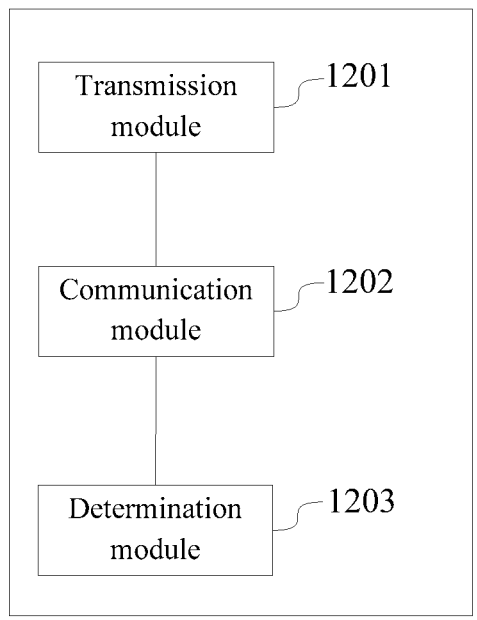
FIG. 12B is a block diagram of a communication device according to a eighteenth aspect of the present disclosure.

In a possible implementation, based on the device composition of FIG. 12A, referring to FIG. 12B, the device further includes a determination module 1203.

The determination module 1203 may be configured to, during the communication with the base station for the first service according to the transmission rate indicated by the first level information, when a second service instruction transmitted by the base station at a transmission rate indicated by second level information is received, determine whether the at least one level information includes the second level information, the second level information being level information corresponding to the second service.

The communication module 1202 may be further configured to, if the at least one level information includes the second level information, communicate with the base station for the second service at a transmission rate indicated by the second level information while communicating with the base station for the first service at the transmission rate indicated by the first level information.

In a possible implementation, the communication module 1202 may be further configured to receive a first level switching instruction transmitted by the base station at a transmission rate indicated by the current level information, switch the current level information to the third level information, and communicate with the base station for the third service at the transmission rate indicated by the third level information, the first level switching instruction carrying the third level information.

Figure 12C:
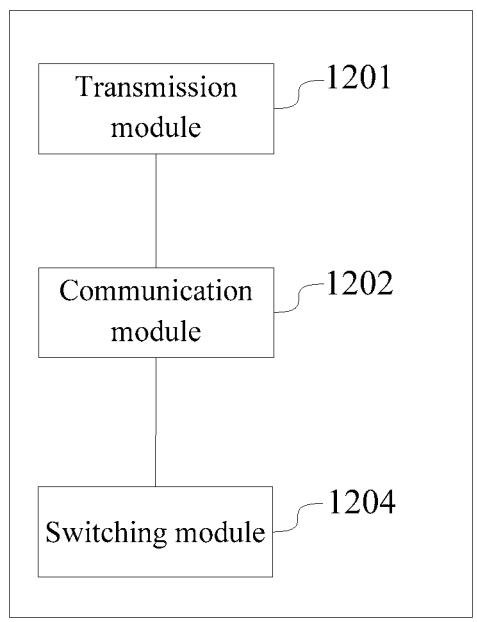
FIG. 12C is a block diagram of a communication device according to a nineteenth aspect of the present disclosure.

In a possible implementation, based on the device configuration of FIG. 12A, referring to FIG. 12C, the device further includes a switching module 1204.

The switching module 1204 may be configured to, when a second level switching instruction transmitted by the base station is received, switch the third level information to the first level information.

The transmission module 1201 may be further configured to transmit a switching success message to the base station, the switching success message being used for instructing the base station to switch the stored third level information corresponding to the UE to the first level information.

In a possible implementation, the level information may be also used to indicate an upper limit of the communication delay of the UE.

All of the alternative technical solutions described above may be combined in any way to form alternative examples of the present disclosure, which are elaborated herein.

Figure 13:
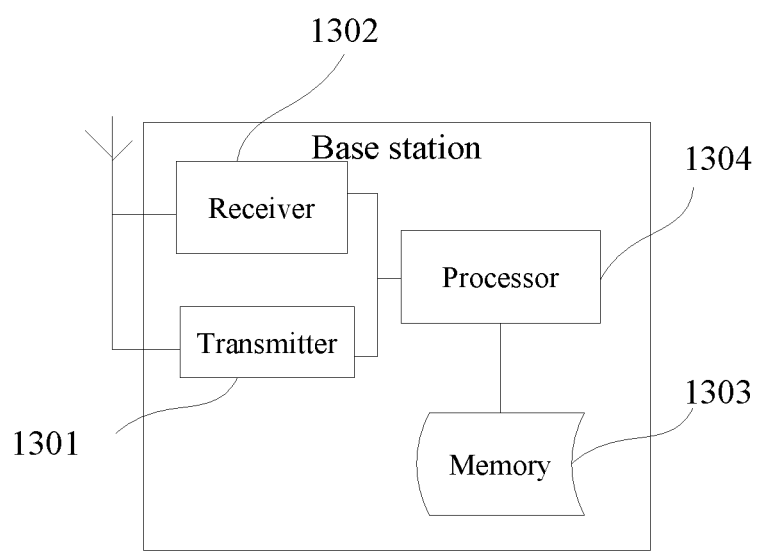
FIG. 13 is a schematic diagram of a structure of a base station according to an aspect of the present disclosure.

FIG. 13 is a schematic diagram of a structure of a base station according to an aspect of the present disclosure. As shown in FIG. 13, the base station includes: a transmitter 1301, a receiver 1302, a memory 1303, and a processor 1304 respectively connected to the transmitter, the receiver, and the memory. The base station may also include common components, such as an antenna, a baseband processing unit, a medium and radio frequency processing unit, an input/output device, and the examples of the present disclosure are not limited thereto. The processor 1304 may be configured to perform a method at the base station side in any of the possible implementations provided by the examples described above.

Figure 14:
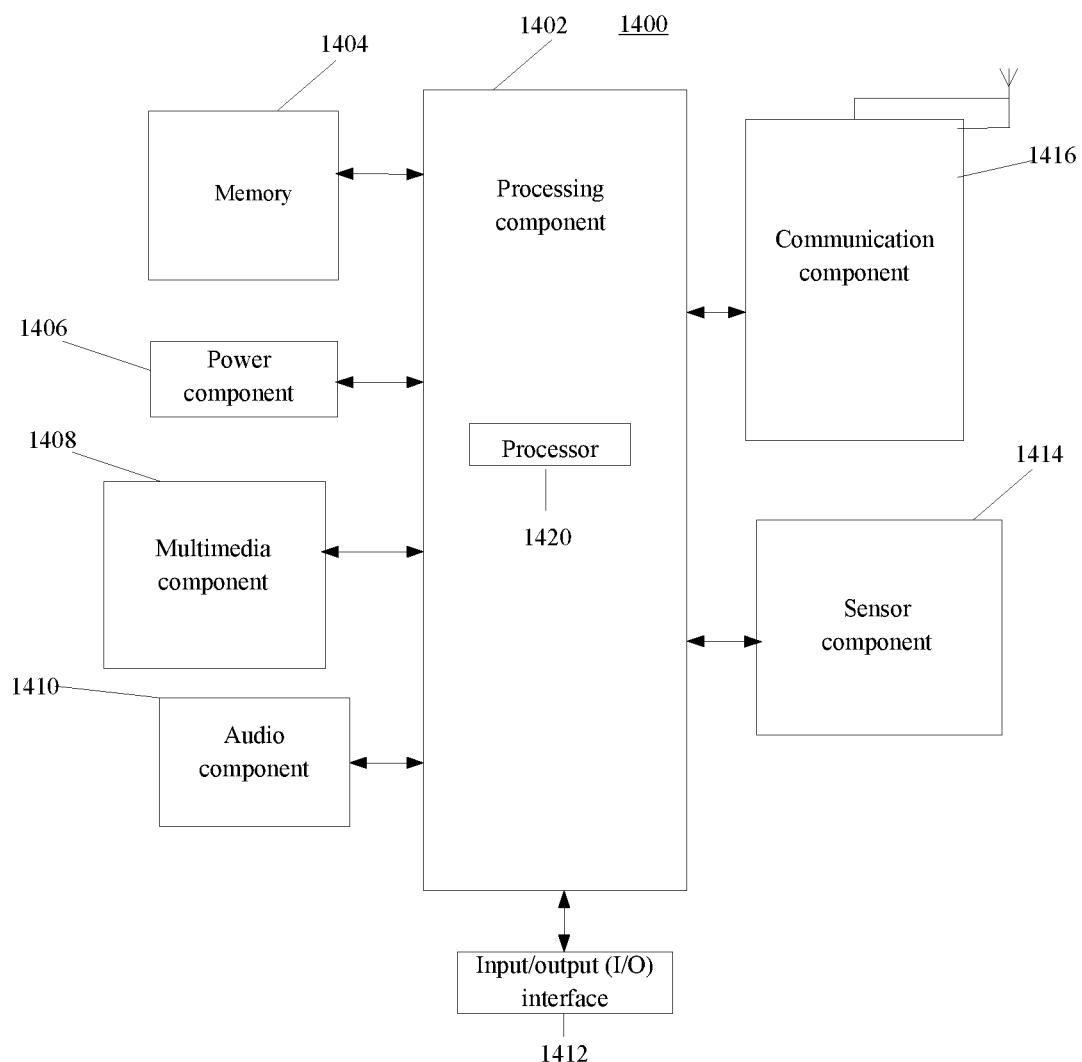
FIG. 14 is a block diagram of a communication device according to a twentieth aspect of the present disclosure.

FIG. 14 is a block diagram of a communication device 1400 according to a twentieth aspect of the present disclosure. For example, the device 1400 may be user equipment UE, a mobile phone, a computer, a digital broadcast terminal, a messaging device, a gaming console, a tablet, a medical device, exercise equipment, a personal digital assistant, and the like.

Referring to FIG. 14, the device 1400 may include one or more of the following components: a processing component 1402, a memory 1404, a power component 1406, a multimedia component 1408, an audio component 1410, an input/output (I/O) interface 1412, a sensor component 1414, and a communication component 1416.

The processing component 1402 typically controls overall operations of the device 1400, such as the operations associated with display, telephone calls, data communications, camera operations, and recording operations. The processing component 1402 may include one or more processors 1420 to execute instructions to perform all or part of the steps in the above described methods. Moreover, the processing component 1402 may include one or more modules which facilitate the interaction between the processing component 1402 and other components. For instance, the processing component 1402 may include a multimedia module to facilitate the interaction between the multimedia component 1408 and the processing component 1402.

The memory 1404 may be configured to store various types of data to support the operation of the device 1400. Examples of such data include instructions for any applications or methods operated on the device 1400, contact data, phonebook data, messages, pictures, video, etc. The memory 1404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1406 provides power to various components of the device 1400. The power component 1406 may include a power management system, one or more power sources, and any other components associated with the generation, management, and distribution of power in the device 1400.

The multimedia component 1408 includes a screen providing an output interface between the device 1400 and the user. In some examples, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some examples, the multimedia component 1408 includes a front camera and/or a rear camera. The front camera and/or the rear camera may receive an external multimedia datum while the device 1400 is in an operation mode, such as a photographing mode or a video mode. Each of the front camera and the rear camera may be a fixed optical lens system or have focus and optical zoom capability.

The audio component 1410 may be configured to output and/or input audio signals. For example, the audio component 1410 includes a microphone ("MIC") configured to receive an external audio signal when the device 1400 is in an operation mode, such as a call mode, a recording mode, and a voice recognition mode. The received audio signal may be further stored in the memory 1404 or transmitted via the communication component 1416. In some examples, the audio component 1410 further includes a speaker to output audio signals.

The I/O interface 1412 provides an interface between the processing component 1402 and peripheral interface modules, such as a keyboard, a click wheel, buttons, and the like. The buttons may include, but are not limited to, a home button, a volume button, a starting button, and a locking button.

The sensor component 1414 includes one or more sensors to provide status assessments of various aspects of the device 1400. For instance, the sensor component 1414 may detect an open/closed status of the device 1400, relative positioning of components, e.g., the display and the keypad, of the device 1400, a change in position of the device 1400 or a component of the device 1400, a presence or absence of user contact with the device 1400, an orientation or an acceleration/deceleration of the device 1400, and a change in temperature of the device 1400. The sensor component 1414 may include a proximity sensor configured to detect the presence of nearby objects without any physical contact. The sensor component 1414 may also include a light sensor, such as a CMOS or CCD image sensor, for use in imaging applications. In some examples, the sensor component 1414 may also include an accelerometer sensor, a gyroscope sensor, a magnetic sensor, a pressure sensor, or a temperature sensor.

The communication component 1416 may be configured to facilitate communication, wired or wirelessly, between the device 1400 and other devices. The device 1400 can access a wireless network based on a communication standard, such as WiFi, 2G or 3G; or a combination thereof. In one example, the communication component 1416 receives a broadcast signal or broadcast associated information from an external broadcast management system via a broadcast channel. In one example, the communication component 1416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In examples, the device 1400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described communication methods at the UE side in FIGS. 1, 4, and 5-8.

In examples, there is also provided a non-transitory computer-readable storage medium including instructions, such as the memory 1404 including instructions, the above instructions are executable by the processor 1420 in the device 1400, for performing the above-described methods. For example, the non-transitory computer-readable storage medium may be a ROM, a RAM, a CD-ROM, a magnetic tape, a floppy disc, an optical data storage device, and the like.

The person skilled in the art can understand that the whole or part of the steps for achieving the above-described examples can be accomplished by hardware, or be accomplished by a program instructing relevant hardware, the program may be stored in a computer readable storage medium, and the above-mentioned storage medium may be a read-only memory, a magnetic disc or an optical disc.

The above contents are only examples of the present disclosure, but are not intended to limit the present disclosure. Any modifications, equivalent replacements, improvements and the like made within the spirit and principles of the present disclosure should be included in the protection scope of the present disclosure.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors.

Other examples of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art.

What is claimed is:

1. A communication method, comprising:
   transmitting at least one level information of a user equipment (UE) to a base station, the at least one level information being used for indicating a transmission rate of the UE for communication, wherein the base station determines an upper limit of the transmission rate according to the level information received from the UE and the determined limit corresponds to the level information for a service and the base station allocates transmission resources to the UE based on the determined upper limit;

when a first service is triggered, querying first level information corresponding to the first service in a corresponding relationship between a service and level information of the UE;

if the at least one level information comprises the first level information, transmitting a first service request to the base station at a first transmission rate indicated by the first level information, the first service request being used for requesting the base station to communicate with the UE for the first service according to the first transmission rate indicated by the first level information;

during the communication of the base station with the UE for the first service according to the first transmission rate indicated by the first level information, when a second service is triggered, querying second level information corresponding to the second service in the corresponding relationship between the service and the level information of the UE; and if the at least one level information comprises the second level information, transmitting a second service request to the base station at a second transmission rate indicated by the second level information while the base station communicates with the UE at the first transmission rate indicated by the first level information, the second service request being used for requesting the base station to communicate with the UE for the second service according to the second transmission rate indicated by the second level information.

2. The method according to claim 1, further comprising:

when a third service is triggered, querying third level information corresponding to the third service in the corresponding relationship between the service and the level information of the UE;

if the at least one level information does not comprise the third level information, switching current level information of the UE to the third level information; and transmitting a third service request to the base station at a third transmission rate indicated by the third level information, wherein the third service request carries the third level information and the third service request is used for requesting the base station to communicate with the UE for the third service according to the third transmission rate indicated by the third level information.

3. The method according to claim 2, transmitting the third service request to the base station, further comprising:

when the communication of the base station with the UE for the third service according to the third transmission rate indicated by the third level information is completed, switching the third level information to the first level information; and transmitting a level switching request to the base station, the level switching request being used for instructing the base station to switch the third level information corresponding to the UE to the first level information.

4. The method according to claim 1, wherein the level information is further used for indicating a communication delay upper limit of the UE.

5. The method according to claim 1, further comprising:

receiving the at least one level information transmitted by the UE, the level information being used for indicating the transmission rate of the UE for communication; and receiving the first service request transmitted by the UE at the first transmission rate indicated by the first level information, and if the at least one level information comprises the first level information, communicating with the UE for the first service according to the first transmission rate indicated by the first level information, wherein the first level information is level information corresponding to the first service.

6. The method according to claim 5, further comprising:

during the communication with the UE for the first service according to the first transmission rate indicated by the first level information, when the second service request transmitted by the UE at the second transmission rate indicated by second level information is received, determining whether the at least one level information comprises the second level information, wherein the second level information is level information corresponding to the second service; and if the at least one level information comprises the second level information, performing communication with the UE for the second service according to the second transmission rate indicated by the second level information while communicating with the UE for the first service at the first transmission rate indicated by the first level information.

7. The method according to claim 5, further comprising:

when a third service request carrying third level information transmitted by the UE at the third transmission rate indicated by the third level information is received, communicating with the UE for the third service according to the third transmission rate indicated by the third level information.

8. The method according to claim 7, communicating with the UE for the third service according to the third transmission rate indicated by the third level information, further comprising:

when a level switching request transmitted by the UE is received, switching the third level information corresponding to the UE to the first level information.

9. The method according to claim 5, wherein the level information is further used for indicating a communication delay upper limit of the UE.

10. A communication method, comprising:

transmitting at least one level information of a user equipment (UE) to a base station, the level information being used for indicating a transmission rate of the UE for communication, wherein the base station determines an upper limit of the transmission rate according to the level information received from the UE and the determined limit corresponds to the level information for a service and the base station allocates transmission resources to the UE based on the determined upper limit;

receiving a first service instruction transmitted by the base station at a first transmission rate indicated by a first level information, and if the at least one level information comprises the first level information, communicating with the base station for the first service according to the first transmission rate indicated by the first level information, the first level information being level information corresponding to the first service;

during the communication with the base station for the first service according to the first transmission rate indicated by the first level information, when a second service instruction transmitted by the base station at a second transmission rate indicated by second level information is received, determining whether the at least one level information comprises the second level information, the second level information being level information corresponding to the second service; and if the at least one level information comprises the second level information, communicating with the base station for the second service at the second transmission rate indicated by the second level information while communicating with the base station for the first service at the first transmission rate indicated by the first level information.

11. The method according to claim 10, further comprising:

receiving a first level switching instruction carrying third level information transmitted by the base station at a transmission rate indicated by current level information, switching the current level information to the third level information, and communicating with the base station for a third service at a third transmission rate indicated by the third level information.

12. The method according to claim 11, after receiving the first level switching instruction transmitted by the base station at the transmission rate indicated by the current level information, further comprising:

when a second level switching instruction transmitted by the base station is received, switching the third level information to the first level information; and transmitting a switching success message to the base station, the switching success message being used for instructing the base station to switch the third level information corresponding to the UE to the first level information.

13. The method according to claim 10, wherein the level information is further used for indicating a communication delay upper limit of the UE.

14. A communication device, comprising:

a processor; and a memory for storing instructions executable by the processor;

wherein the processor is configured to: transmit at least one level information of a user equipment (UE) to a base station, the at least one level information being used for indicating a transmission rate of the UE for communication, wherein the base station determines an upper limit of the transmission rate according to the level information received from the UE and the determined limit corresponds to the level information for a service and the base station allocates transmission resources to the UE based on the determined upper limit; and receive a first service instruction transmitted by the base station at a first transmission rate indicated by first level information, and if the at least one level information comprises the first level information, communicating with the base station for the first service at the first transmission rate indicated by the first level information, the first level information being level information corresponding to the first service;

during the communication with the base station for the first service according to the first transmission rate indicated by the first level information, when a second service instruction transmitted by the base station at a second transmission rate indicated by second level information is received, determine whether the at least one level information comprises the second level information, the second level information being level information corresponding to the second service; and if the at least one level information comprises the second level information, communicate with the base station for the second service at the second transmission rate indicated by the second level information while communicating with the base station for the first service at the first transmission rate indicated by the first level information.

15. The device according to claim 14, wherein the processor is further configured to:

receive a first level switching instruction carrying third level information transmitted by the base station at a transmission rate indicated by current level information, switch the current level information to the third level information, and communicate with the base station for a third service at a third transmission rate indicated by the third level information.

16. The device according to claim 15, wherein the processor is further configured to:

when a second level switching instruction transmitted by the base station is received, switch the third level information to the first level information; and transmit a switching success message to the base station, the switching success message being used for instructing the base station to switch the third level information corresponding to the UE to the first level information.

17. The device according to claim 14, wherein the level information is further used for indicating a communication delay upper limit of the UE.

* * * * *